Dec. 5, 1939. H. P. BOSWAU Re. 21,284

SUPERVISORY CONTROL SYSTEM

Original Filed May 27, 1932 14 Sheets-Sheet 1

INVENTOR
HANS P. BOSWAU
BY
ATTORNEY

SUPERVISORY CONTROL SYSTEM

Original Filed May 27, 1932 14 Sheets-Sheet 2

INVENTOR
HANS P. BOSWAU
BY
ATTORNEY

Dec. 5, 1939. H. P. BOSWAU Re. 21,284

SUPERVISORY CONTROL SYSTEM

Original Filed May 27, 1932 14 Sheets-Sheet 3

INVENTOR
HANS P. BOSWAU
BY
M. Crawford
ATTORNEY

SUPERVISORY CONTROL SYSTEM

Original Filed May 27, 1932 14 Sheets-Sheet 4

INVENTOR
HANS P. BOSWAU
BY W. M. Crawford
ATTORNEY

SUPERVISORY CONTROL SYSTEM

Original Filed May 27, 1932 14 Sheets-Sheet 5

INVENTOR
HANS P. BOSWAU
BY
ATTORNEY

SUPERVISORY CONTROL SYSTEM

Original Filed May 27, 1932 14 Sheets-Sheet 6

INVENTOR
HANS P. BOSWAU

By F. M. Crawford
ATTORNEY

Dec. 5, 1939. H. P. BOSWAU Re. 21,284

SUPERVISORY CONTROL SYSTEM

Original Filed May 27, 1932 14 Sheets-Sheet 7

INVENTOR
HANS P. BOSWAU

By M. Crawford
ATTORNEY

SUPERVISORY CONTROL SYSTEM
Original Filed May 27, 1932 14 Sheets-Sheet 8
FIG.-8
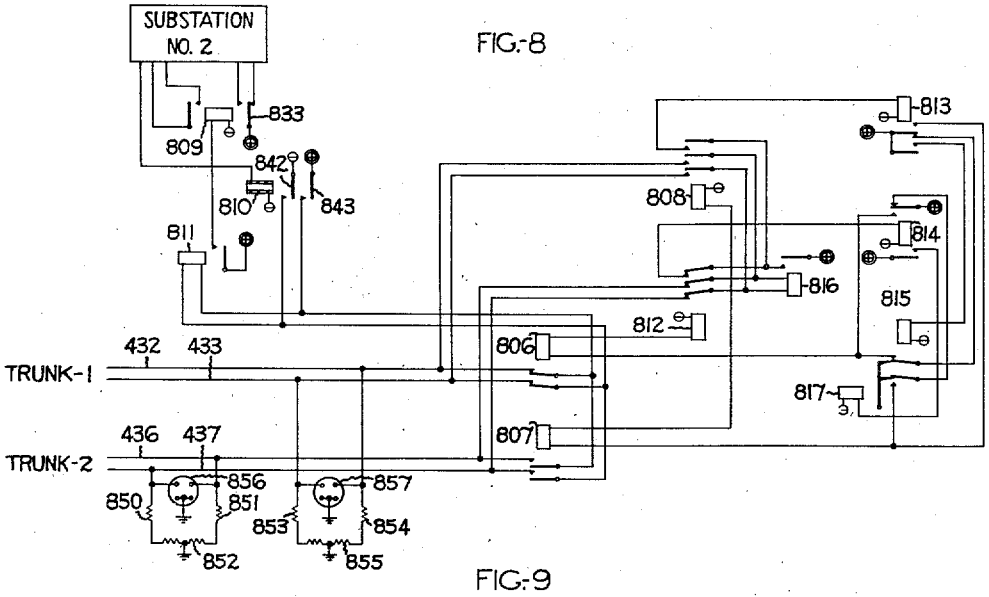
FIG.-9
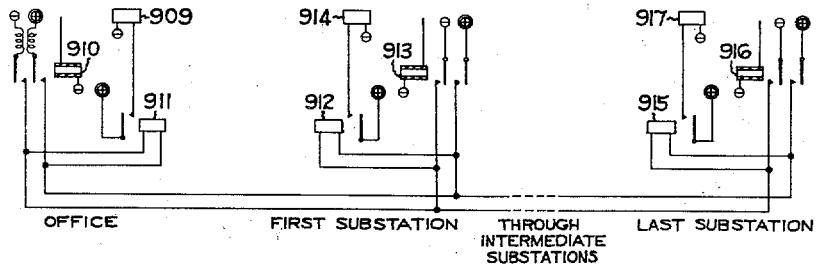
PARALLEL LINE CIRCUIT
FIG.-10
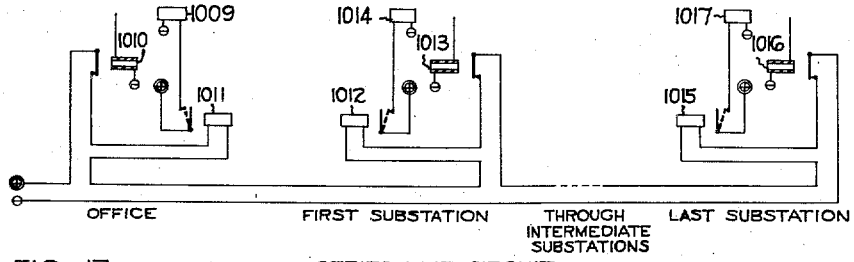
SERIES LINE CIRCUIT
FIG.-17
| | | | |
|---|---|---|---|
| FIG:1 | FIG:3 | FIG:6 | FIG:7 |
| FIG:2 | FIG:4 | FIG:5 | |
INVENTOR
HANS P. BOSWAU
By M. Crawford
ATTORNEY

SUPERVISORY CONTROL SYSTEM

Original Filed May 27, 1932 14 Sheets-Sheet 9

INVENTOR
HANS P. BOSWAU
BY
W. M. Crawford
ATTORNEY

Dec. 5, 1939. H. P. BOSWAU Re. 21,284

SUPERVISORY CONTROL SYSTEM

Original Filed May 27, 1932 14 Sheets-Sheet 10

INVENTOR
HANS P. BOSWAU
BY
G. M. Crawford
ATTORNEY

SUPERVISORY CONTROL SYSTEM

Original Filed May 27, 1932 14 Sheets-Sheet 11

POINT SELECTION

INVENTOR
HANS P. BOSWAU
BY
W. Crawford
ATTORNEY

SUPERVISORY CONTROL SYSTEM

Original Filed May 27, 1932 14 Sheets-Sheet 12

INVENTOR
HANS P. BOSWAU
BY P. M. Crawford
ATTORNEY

Dec. 5, 1939. H. P. BOSWAU Re. 21,284

SUPERVISORY CONTROL SYSTEM

Original Filed May 27, 1932 14 Sheets-Sheet 13

INVENTOR
HANS P. BOSWAU
BY
F. M. Crawford
ATTORNEY

Dec. 5, 1939. H. P. BOSWAU Re. 21,284

SUPERVISORY CONTROL SYSTEM

Original Filed May 27, 1932 14 Sheets-Sheet 14

INVENTOR
HANS P. BOSWAU
BY
J. M. Crawford
ATTORNEY

Reissued Dec. 5, 1939 Re. 21,284

UNITED STATES PATENT OFFICE 21,284

SUPERVISORY CONTROL SYSTEM

Hans P. Boswau, Lorain, Ohio, assignor to The North Electric Mfg. Company, a corporation of Ohio Original No. 2,059,204, dated November 3, 1936, Serial No. 613,864, May 27, 1932. Application for reissue August 10, 1938, Serial No. 224,226

27 Claims. (Cl. 177—353)

My invention relates to signalling systems, and more particularly to supervisory control systems in which a plurality of substations are selectively controlled and supervised over a single signalling channel.

In supervisory control systems where a large number of substations are to be supervised and controlled from a single dispatching office, there is often not more than one signalling channel available for operation. In such cases the system must operate over a single trunk without any sacrifice of the safe-guarding features which insure synchronous operation without possibility of failures. Such safe-guarding is necessary in a supervisory control system where many operations, if improperly made, would entail serious consequences.

Accordingly, an object of my invention is to provide a supervisory control system for controlling and supervising a plurality of substations from a single dispatcher's office over a single signalling trunk.

A further object of my invention is to provide a supervisory control system in which apparatus in a plurality of substations may be selected, controlled and supervised over a single pair of conductors by means of synchronous selecting apparatus at each of said stations.

Still a further object of my invention is to provide means in a supervisory control system for selecting, supervising, and controlling remote apparatus used in a plurality of substations over a single signalling channel, the remote operations of the selected unit being dependent automatically upon a check at the dispatcher's office of the selection made at the substation.

Another object of my invention is to provide means in a supervisory control system for supervising and controlling a plurality of remote substations to prevent interference with, or loss of, signals in the event that more than one substation or the dispatcher's office and a substation attempt to signal over the same signalling channel simultaneously.

In many supervisory control systems, the conductors, over which the supervisory signals are sent, are paralleled with the power conductors in which the circuit breakers to be controlled are located. Surges in these power conductors are often so severe as to inductively induce sufficient current in the signalling circuits to render them useless by the transmission of false signals at the very time when the circuit is most needed for use.

Accordingly, an object of my invention is to provide means in a supervisory control system for preventing false operations in a supervisory control system due to currents induced therein by an adjacent power line.

Still a further object of my invention is to provide a normally open-circuited supervisory control system for controlling and supervising a plurality of substations from a single central station.

Still a further object of my invention is to provide a supervisory control system in which the receiving apparatus in each of a plurality of remote stations are multiplied to a single signalling channel extending from the dispatcher's office to each of the remote substations.

Still a further object of my invention is to provide means in a supervisory control system for controlling and supervising a plurality of remote substations over a single channel, with transmitting and receiving apparatus, individual to the remote substations, connected in series in the single signalling channel.

Still a further object of my invention is to provide means for transmitting station, group, and unit selection code combinations of impulse conditions over a single signalling channel for selecting one of said substations, one of a plurality of groups in the selected substation and one of a plurality of units in the particular selected group, for operation from a central dispatching point.

Still a further object of my invention is to provide means in a multi-substation supervisory control system operated over a single signalling channel for locking out all but a selected substation.

Still a further object of my invention is to provide means in the same apparatus at the substation to function either as a transmitter or a receiver in accordance with whether the station is to transmit or receive signals.

In the development of supervisory control systems, the necessity for insuring accurate operation requires that, following each selection, a check be made of the selection. As a result, the number of circuits and relays increases and results in complications of the system. It is accordingly essential, wherever possible, to simplify the circuit design and to reduce the number of apparatus as much as possible.

Accordingly, an object of my invention is to provide means whereby the counting relay chains need require only a single armature for the selecting operations.

Still a further object of my invention is to provide means whereby the same circuit which controls the station selection, may be used for controlling the check code for the station selection and the same circuit which stops the group and unit selection code also responds to the group and unit check code.

Still a further object of my invention is to provide means whereby a single armature on each of the counting relay chains functions to carry out all the necessary functions including selection, identification by means of the check code, and the operation of the selected unit.

In many instances, it is desirable to check the positions of breakers at the substations. If a single master check is provided for this operation, it will be necessary to check all the apparatus at each of the substations whereas the dispatcher may desire to check only one substation at a time.

Accordingly, another object of my invention is to provide means whereby in a multi-substation supervisory control system, the apparatus units at each of the substations may be separately checked.

There are other objects of my invention which, together with the foregoing, will appear in the detailed description of the invention given in connection with the drawings in which:

Figure 8 is a circuit diagram of my invention diagrammatically showing the signalling conductor connected to a third station.

Figure 9 is a circuit diagram of my invention showing the line relays and transmitters connected across the line.

Figure 10 is a circuit diagram of a modified form showing the line relays and transmitters connected in series with the line.

Figures 11 to 16 are charts showing the sequence of relay operations when a remote unit is selected and controlled.

Figure 17 shows the manner in which Figures 1 to 7 should be combined to form a complete illustration of the system.

Figure 1:
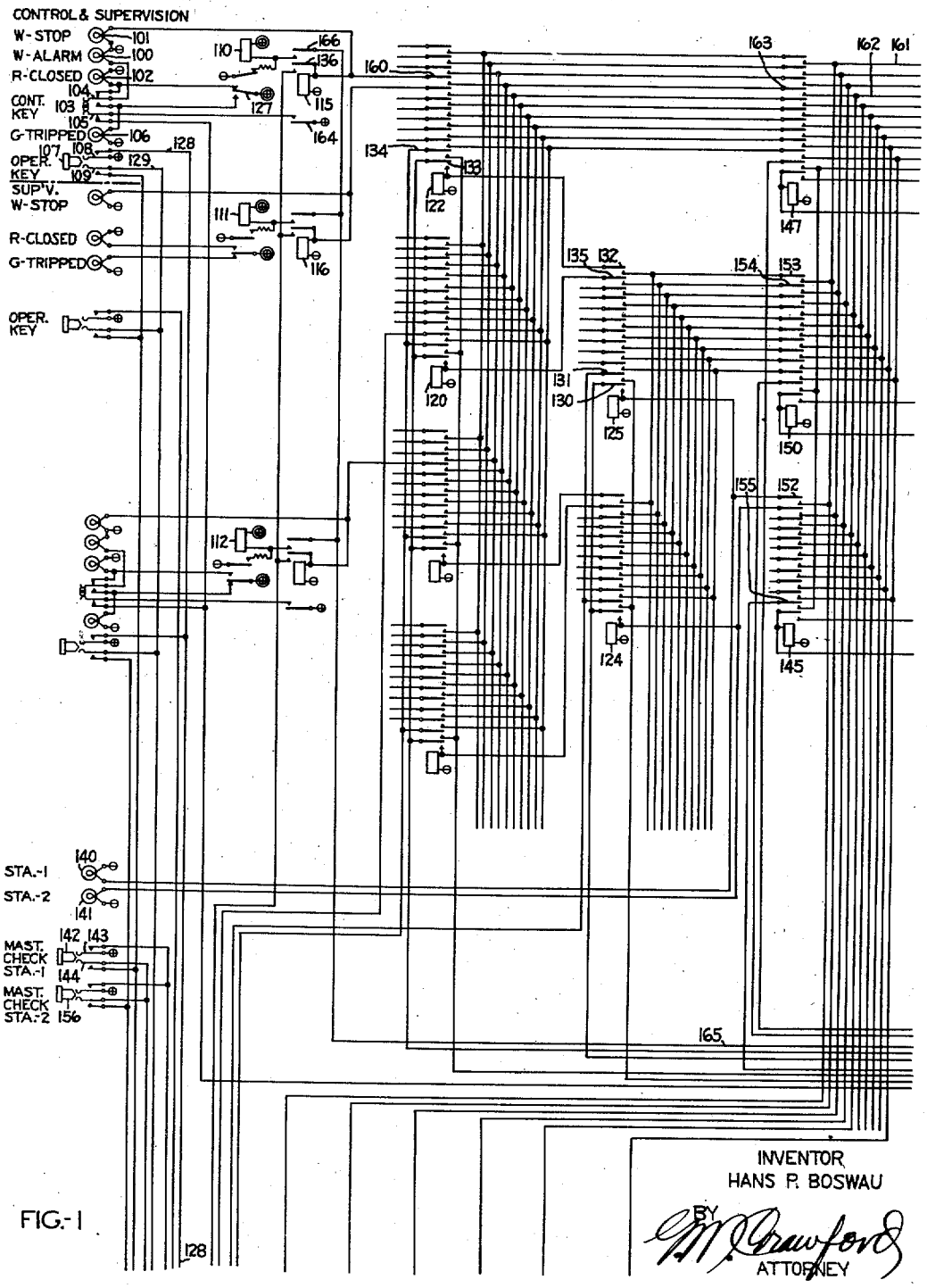
Figures 1 to 4 are the circuit diagrams of apparatus employed at the dispatcher's office.
Figure 2:
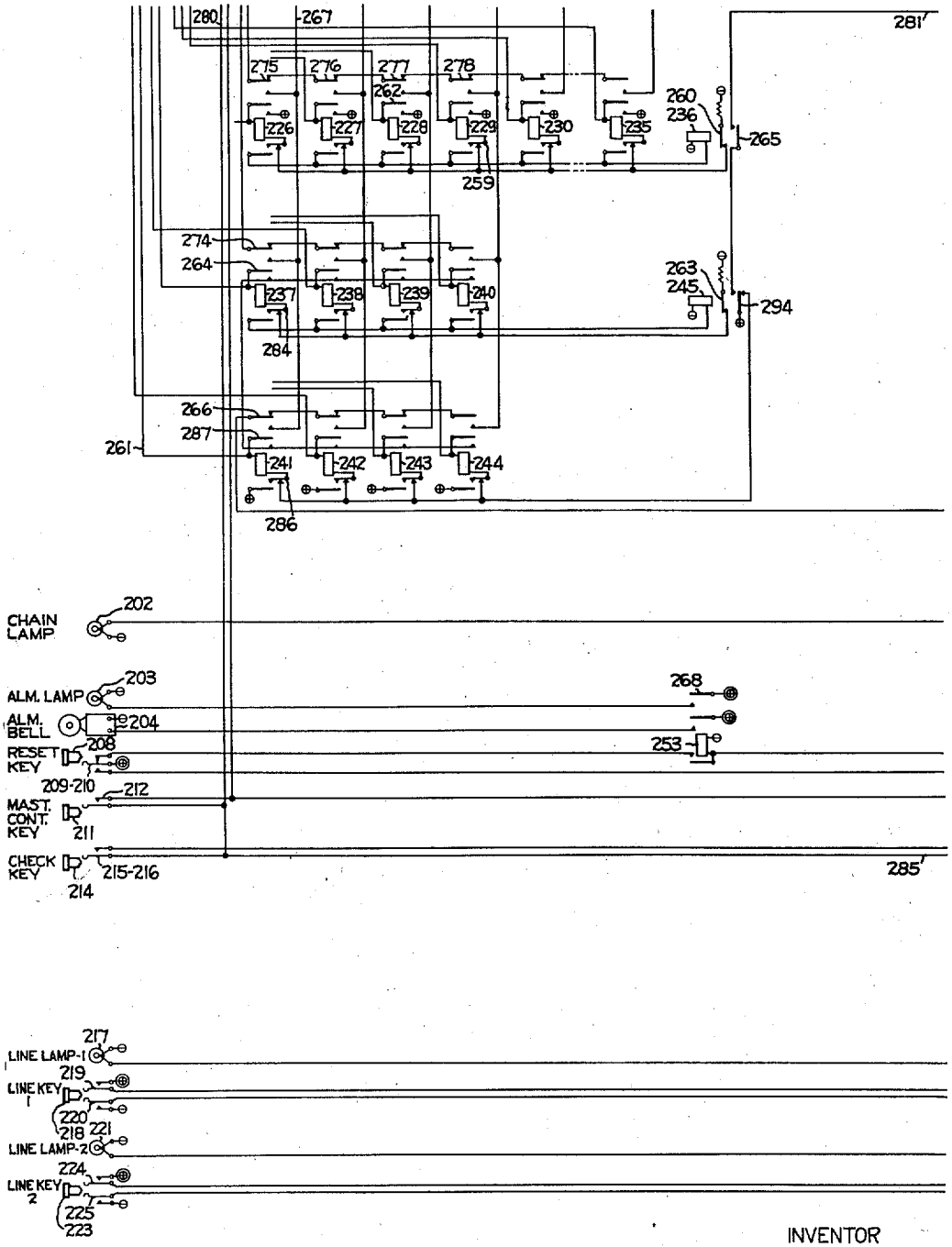
Figure 3:
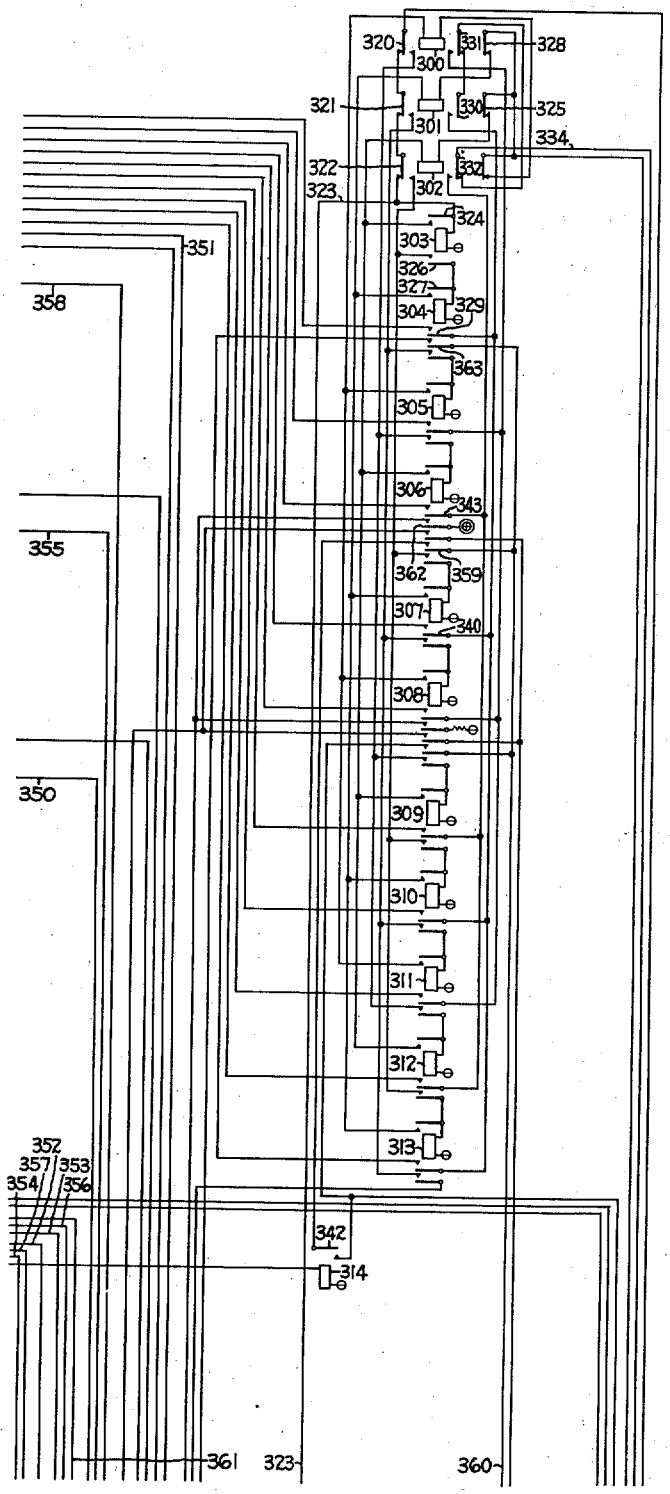

Generally, my invention comprises circuit arrangements at the office and at each of a plurality of substations by means of which apparatus at each of a plurality of remote stations may be supervised and controlled from the same office over a single signalling channel, consisting, in the embodiment shown, of a single trunk circuit. The apparatus at the office and each of the substations are normally in condition for receiving signals from any one of the other stations.

At the office, if a key operation is performed for controlling a remote apparatus unit, relays are operated in response to this key operation for switching the apparatus thereat into a transmitting condition; at the same time setting up on the relays a predetermined code to be transmitted. Thereafter, impulses are transmitted from the office to the substation and as each impulse is transmitted, counting relays at the office and the substations are successively energized. A predetermined relay, operating through the contacts of the counting chain and the code controlling relays, energizes when the proper counting relay has been energized to stop the transmission of further counting impulses. Thereafter, the office conditions itself for receiving impulses while the substation which has been selected transmits check impulses back to the office to indicate the selection. The particular substation which has been selected is determined by the energization of a relay (also through the armatures of the counting chain) which will condition that particular substation for sending back the check signals, and for selecting that station, whereas at all the other stations when the first set of impulses stops on the same counting chain relay, a relay is energized which locks out these other substations from further responses to signalling impulses.

Thereafter, the selected substation sends back to the office check signals in accordance with the selected station which indicates the particular substation which has been selected. On receipt of these impulses at the office through the counting chain, a relay is again energized at the office which switches the office to a transmitting condition. The office thereupon again transmits a code of group selecting impulses which operate the counting chains at both the office and selected substation.

At the office again, when the proper counting relay is energized, a predetermined relay is operated over the armatures of the counting relay and the group code controlling relay, which has been energized by the original key operation, and this stops the transmission of further group selecting impulses. At the selected substation the group selecting code which is received operates the counting chain to make a predetermined group selection and then starts to transmit back to the office a combination of impulses indicating the particular group selection which has been made. The office in response to this checking code, after an interval of time, again conditions itself for transmitting impulses and transmits the third or unit code selecting combination. This unit code combination is also stopped by a point code controlling relay which, as stated above, was originally energized in response to the key operation.

In the same manner, a check code is sent back from the substation indicating the unit selection and thereafter an operation control code is transmitted to operate the selected unit in the manner desired by the dispatcher and a supervising signal is sent back to the office indicating the final operation of the unit.

By means of this special circuit arrangement, the same signalling channel comprising in the embodiment shown, two trunk conductors, and the same counting chain or selecting apparatus at both the office and substation are utilized for the transmission of station selecting code impulses, group selecting code impulses, and unit selecting code impulses interposed by check impulses for the station, group and unit selection, and finally of the operation control code and supervising code. The same signalling conductors and, in fact, the same apparatus is also employed for the transmission of signals in the event of an automatic operation at the substations, for automatic release of the apparatus in the event of their failure in checking, for a reset operation from the office and for any other desired function of a supervisory control system.

With the system in non-operating condition and normal, the relay 428 is energized over an obvious circuit including the back contact and armature 434. The relay 428 is a slow to deenergize relay and is normally maintained energized during all operations to apply positive battery over the armature 435 at all times, except when the apparatus is to be restored to normal, as will be explained in detail hereinafter.

Normally, the relays 487 and 498 are also energized over a circuit from battery through the windings of relays 487 and 498 in series over the armature and front contact 488 of relay 494 and the back contact and armature 489 of relay 496 to positive battery. Although the relay 494 is at this time deenergized, its armature 488 is held locked against its front contact by the latch member 460 which is controlled by the relay 495. The operation of this relay will be more clear from the description hereinafter.

Relays 498 and 487 control a switch circuit which throws the trunk conductors 432 and 433 in operative relation with the line relay 431 while at the same time associating a relay 484 with the alternate group of trunk conductors 436 and 437 for the purpose to be described in more detail hereinafter.

It will be noted that relay 110, which is the supervisory relay individual to one of the points, is in an energized condition for indicating that the associated breaker at the remote substation is in a closed condition. On the other hand, relays 111 and 112, which are supervisory relays individual to other points, are shown deenergized to indicate a present tripped condition of their associated breakers.

Relays 585 and 582 are also normally energized over a circuit from negative battery through the windings of relays 585 and 582 in series, armature and front contact 592 of relay 589, and the back contact and armature 593, to positive battery. Although the relay 589 is at this time deenergized, its armature 592 is held locked in engagement with its front contact by the locking device 594 which in turn is controlled by the relay 591.

Energization of the relay 582 associates the trunk conductors 432 and 433 with the line relay 511 over the armatures 595 and 596. In the event of any difficulty occurring, however, on the trunk conductors 432 and 433, the trunk conductors 436 and 437 may be substituted therefor by opening the circuit of trunk conductors 432 and 433 at armatures 595 and 596 and closing instead the trunk conductors 436 and 437 over the armatures of relay 583 to the line relay 511, and, at the same time, the trunk conductors 432 and 433 may be connected over the armatures of relay 584 to the relay 586. These operations will be described in more detail hereinafter.

The relay 508 at the substation is also normally energized at this time over an obvious circuit including the back contact and armature 533 of relay 509. The relay 508, which is the release relay, is normally energized and held energized during the stepping impulses. This relay is released only when the entire set is restored to normal. With the relay 508 energized, positive battery is applied to all points showing a single circle and positive symbol.

Relays 725, 726 and so forth, at the substation, are all normally energized, as shown, over locking circuits, which, in the case of relay 725, extend from positive battery over the armature 738 and its front contact of relay 725, armature 739 and its front contact of relay 720, through the winding of the relay 725, conductor 740, back contact and armature 786, to negative battery.

The locking circuits for the other relays 726 and so forth are completed over similar circuits including the armatures of their individual relays, such as 721 and so forth. These individual relays 720, 721 and so forth, are individual to the breakers and are controlled by the auxiliary switch on their breakers. These relays are either energized or deenergized in accordance with the condition of the associated breaker, relay 720 being shown energized, but as will be clear from the description hereinafter, the locking circuit for relays such as 725 are completed irrespective of the position of armatures such as 739 of the individual relays such as 720. The relays 725, 726 and so forth are point start relays which are momentarily released when their associated breaker changes its position from either closed to trip or vice versa. When a relay such as 725 is momentarily released, it functions to start the apparatus at the substation into operation in a manner to be described in detail hereinafter.

The relay 490 at the office is also normally energized and locked over its own armature 492. This is the battery relay which is normally energized and releases only when the office battery is interrupted for any reason. After release of this relay 490, as soon as the office battery comes back, the office and all substations are automatically restored to normal by the operation of the release start relay 491 in a manner to be described in detail hereinafter.

In order to explain the operations in detail it will be assumed that the dispatcher desires to trip the breaker associated with the operating key 107. It will be noted at this time that the breaker associated with this particular point is in a closed condition since the relay 110 is energized and an energizing circuit is completed for the red lamp 102 from negative battery, through the filament of the lamp 102, over the front contact and armature 127, to positive battery. Lamp 102 is thus illuminated indicating a closed condition of this breaker.

The operator will now press the key 107 which will operate the contacts 108 and 109 into engagement with their respective contact points. This key, which is of the non-locking type, is momentarily depressed and thereafter automatically restored to its normal condition by spring action in any well known manner. As a result of the depression of key 107, an energizing circuit is completed for the relay 229 from positive battery to the contact 108 into engagement at this point, conductor 128 through the winding of the relay 229, its armature 259 and back contact, and back contact and armature 260, to negative battery.

A further energizing circuit is completed for the relays 241 and 237 from positive battery over armature 284 and its back contact, back contact and armature 286, through the winding of the relay 241, over the conductor 261, the contact 109 in engagement with its contact point, conductor 129, through the winding of relay 237, armature and back contact 284, back contact and armature 263, to negative battery.

The relay 229 is one of a group of relays 226 to 235 which are the point code relays, one of which is energized when an operate key such as 107 is depressed and determines the code to be transmitted for making the point or unit selection.

The relay 237 is one of a group of relays 237 to 240, which is a tens key relay and is energized when the operate key is depressed to determine the code to be transmitted for making the group or tens selection.

The relay 241 is one of a group of relays 241 to 244, which is energized when the operate key is depressed to determine the code to be transmitted for making a station selection, all of which will be described in detail hereinafter.

From the above detailed circuit description, it will be noted that one of the contacts, such as 108, controls the energizing circuit for the point selecting relay such as 229 whereas the other contact, such as 109, on the operate key is interposed between a group selecting relay 237 and station selecting relay 241 so that three relays, a point, a group, and a station relay, are all energized in response to a single key operation.

As a result of the energization of relay 229, a locking circuit is completed for this relay from positive battery over the front contact and armature 262, through the winding of relay 229, armature 259 and its front contact and the winding of the relay 236 to negative battery. The armature 259 of relay 229 being a make before break contact, as shown, will engage its front contact before breaking its back contact to insure completion of the above described circuit for the relay 236. Relay 236 upon energization, operates its armature 260 to disengage its back contact. Inasmuch as the energizing circuit for each of the point selecting relays 226 to 235 are all completed over the back contact of armature 260, no other of these relays can be energized in the event the dispatcher should for any reason depress a second operate key.

Furthermore, the locking circuit for the relay 229 now maintains this relay energized independently of the operate key, so this key may now be restored to normal without affecting the code to be transmitted.

As a result of the energization of relays 237 and 241, a locking circuit is completed for these two relays from positive battery at relay 241, front contact and armature 286, through the winding of relay 241, the armature 287 of relay 241 and its front contact, front contact and armature 264, through the winding of relay 237, armature 263 and its front contact, and through the winding of relay 245, to negative battery. Relay 245 energizes and at armature 263 opens any further energizing circuit for the remaining group relays 238 to 240 and at its armature 294 opens the energizing circuits for the remaining station code controlling relays 242 to 244.

At the same time a starting circuit is completed from positive battery over the armature 294 and its front contact, armature 265 and its front contact, over the conductor 281, the back contact and armature 438 of relay 420, armature and back contact 402a and through the winding of relay 419, to negative battery. A multiple circuit is also completed with this circuit for the winding of relay 404 to negative battery. The relays 404 and 419 are start relays which are energized when an operate key is depressed and function to make the office end of the system the originating or transmitting end.

It will be noted that the above traced circuit for the start relays 404 and 419 is controlled by the armature 294 and 265 of relays 245 and 236, which are energized when the point, group and station code controlling relays are energized and locked in response to a key operation. The above traced circuit for the start relays 404 and 419 is also controlled over the back contact and armature 402a of relay 402, which energizes as soon as the first line impulse is sent or received, in a manner to be described hereinafter.

The fact that armature 402a is in engagement with its back contact indicates that no substation signals are being received at this time and that accordingly the office end may seize the system for the transmission of selecting impulses. If, on the other hand, substation impulses were being received, the start relays 404 and 419 could not have been energized, even though the point, group, and station code controlling relays had been energized in response to a key operation.

As a result of the energization of the start relay 404, a locking circuit for itself and 419 is completed over 404c and an energizing circuit is completed for the relay 427 from negative battery thereat through the winding of relay 427, back contact and armature 441, the front contact and armature 404a and armature 443 of relay 418 and its back contact to positive battery.

The relay 427 is a sending start relay which functions on energization to change the normal condition of the system at the office end from a receiving condition to a sending condition. In order to insure that this relay 427 is not energized at a time when impulses are being received from the substation, its circuit is also completed over the back contact of armature 441 of relay 421, which is energized during the period that impulses are being received from the substation. The circuit for relay 427 is also controlled by relay 418 for the purpose to be described hereinafter.

As a result of the energization of relay 427, an energizing circuit is completed for the relay 430 from negative battery, through the winding of relay 430, armature 444 and its back contact, armature 445 and its back contact, and the front contact and armature 446 to positive battery.

The relay 430 is an impulse sending relay which is now about to send code combinations of impulses over the trunk conductors in accordance with the particular station, group and point selecting relays which have previously been energized as described hereinbefore. The relay 430 will now be energized and deenergized intermittently in conjunction with the relay 425 over the armature 445, on which it will be recalled relay 430 found its energizing circuit.

Figure 4:
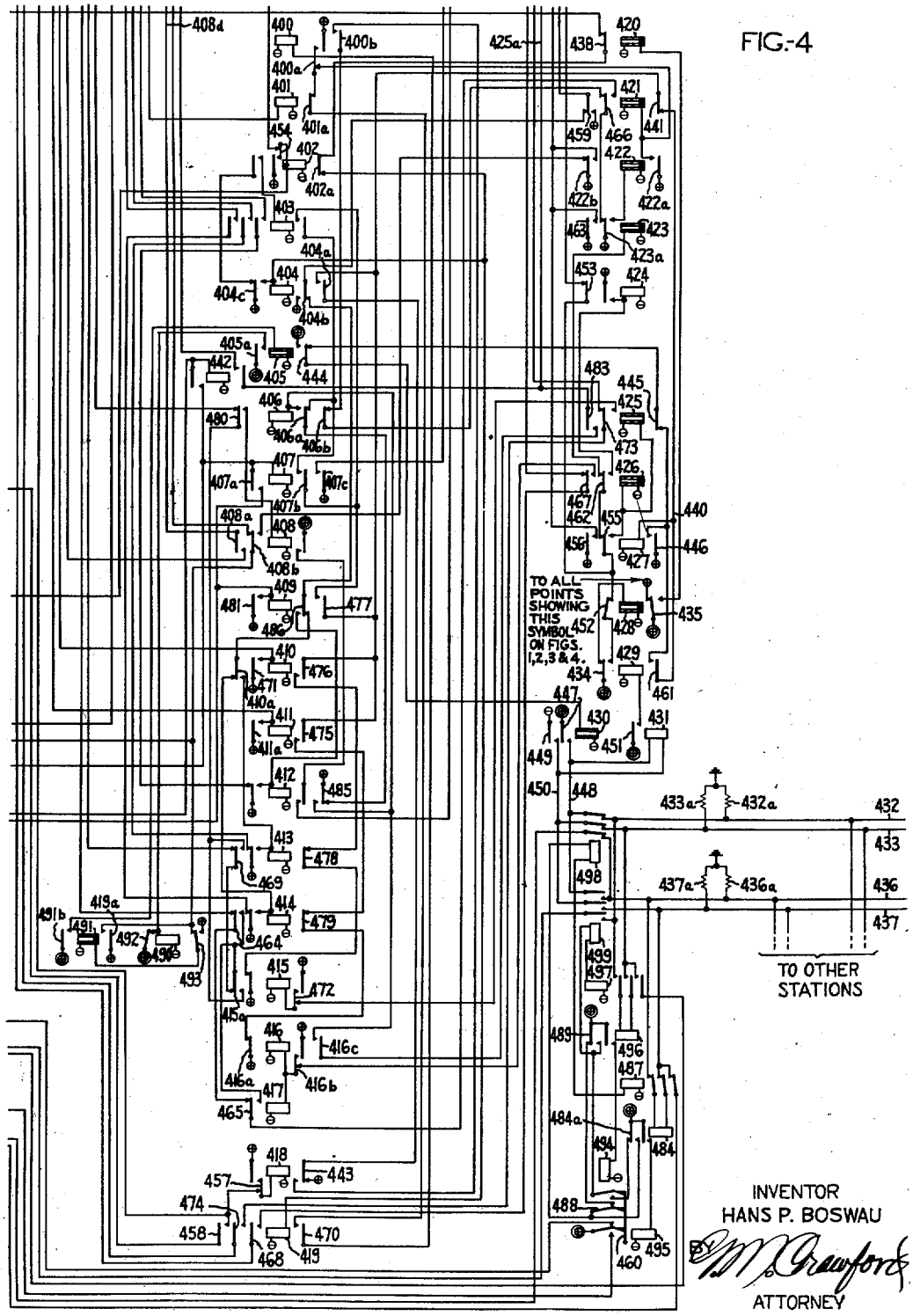
Figure 5:
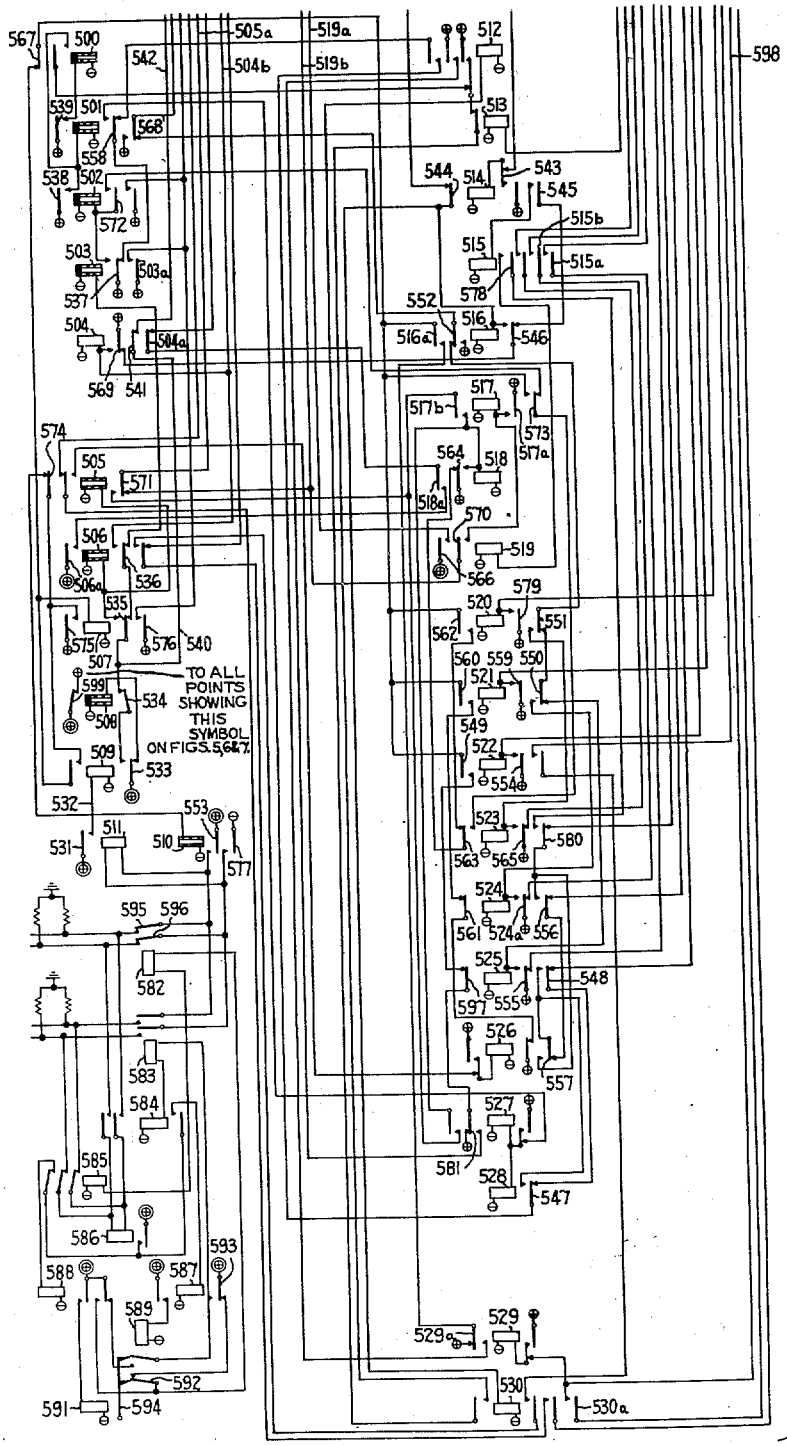
Figures 5 to 7 are the apparatus employed at the substations.
Figure 6:
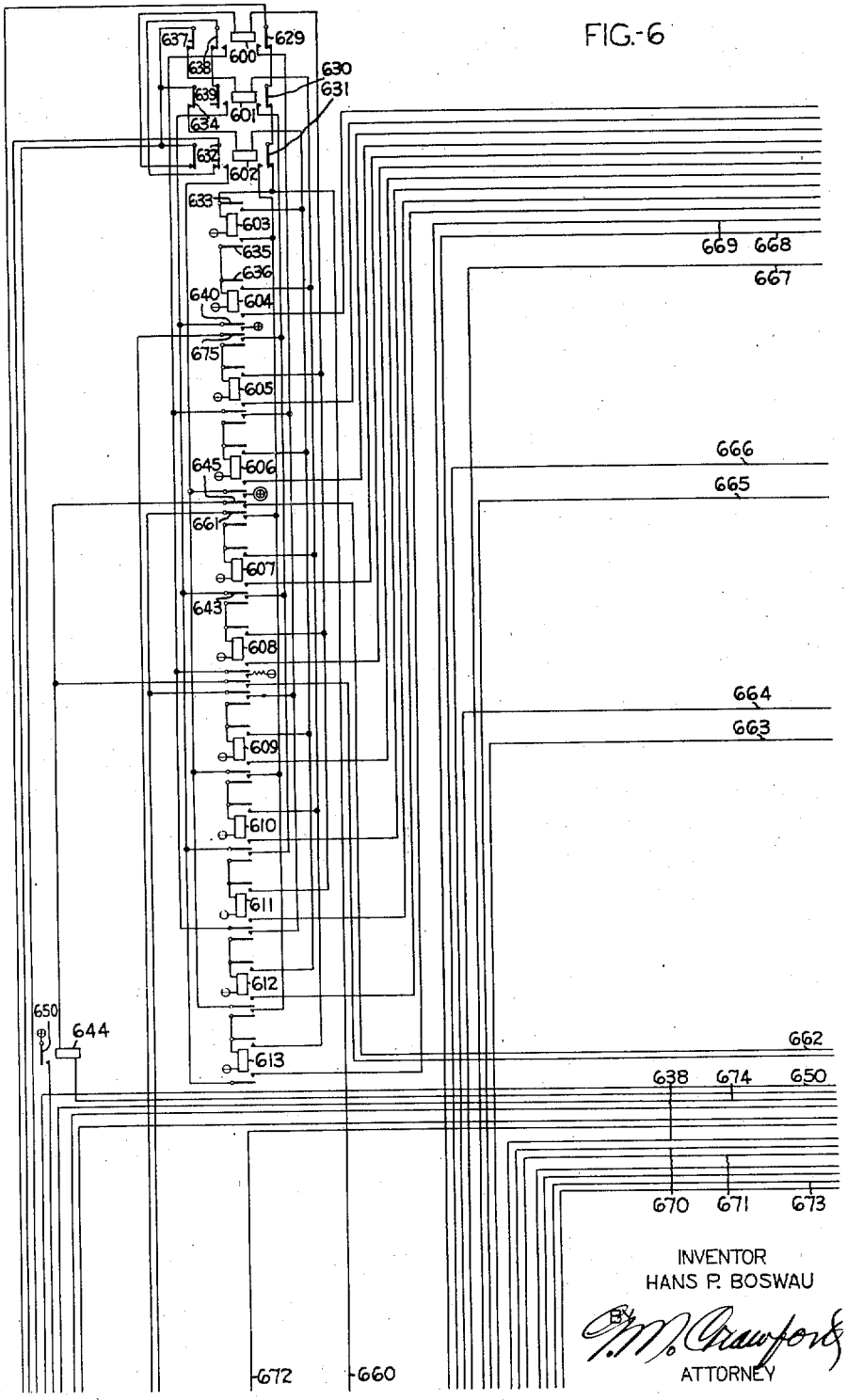
Figure 7:
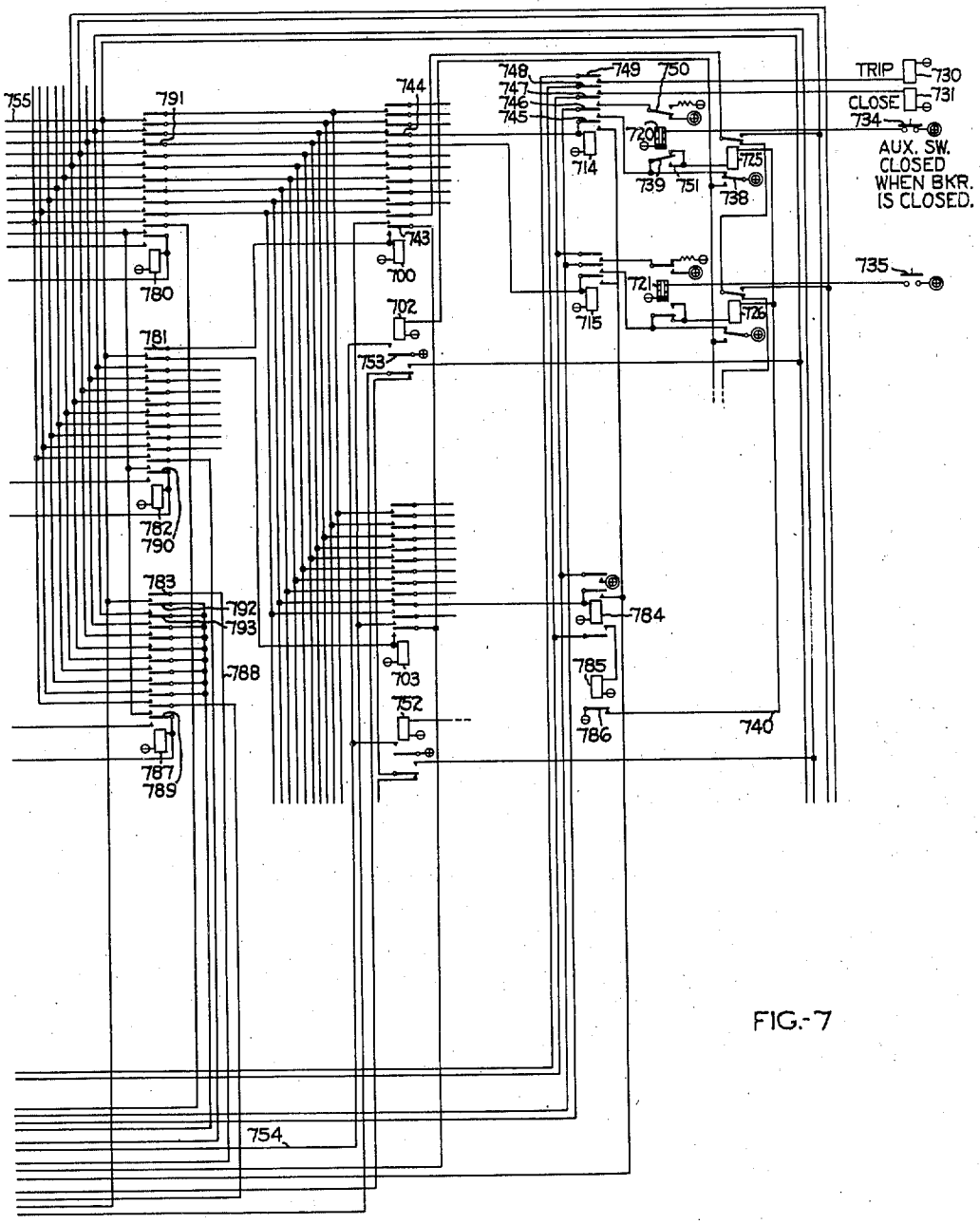

As a result now of the energization of relay 430, positive battery is applied over armature 447 and the conductor 448 to the trunk conductor 432, and negative battery is applied over the armature 449 and conductor 450 to the trunk conductor 433. Energy from this same source is also applied across the line relay 431 at the office. Simultaneously energy is applied over trunk conductors 432 and 433 over front contacts and armatures 595 and 596 to the relay 511 at the substation. Accordingly, the line relays 431 and 511 are energized simultaneously. The line relays of other substations, as indicated in Fig. 4, are also energized.

As a result of the energization of line relay 431 at the office, an energizing circuit is completed from positive battery over the armature 451 and its front contact of relay 431, through the winding of relay 429 to negative battery.

The relay 429 upon energization now performs a number of functions among which is the energization of the first counting chain relay, which counts the first or blank step. The circuit extends from positive battery over the armature 434 and its front contact, armature 452 and its front contact, armature, 453 and its back contact, through the armature 320 and its back contact, armature 321 and its back contact, armature 322 and its back contact and through the winding of relay 303 to negative battery. A multiple circuit is at the same time completed over the conductor 323 and the back contact and armature 454 and the winding of relay 402. Relay 402 is thereupon energized and operates its make-before-break armature 454 to engage its front contact and lock the relay 402 in energized position.

A further result of the energization of relay 429 is to open the energizing circuit for the slow relay 428 and at the same time to complete multiple energizing circuits for the two slow relays 425 and 426 over the armature 455 and its front contact.

As a result of the energization of relay 425, the energizing circuit for the relay 430 is opened at armature 445 and the slow relay 430 deenergizes after an interval of time. Upon the deenergization of relay 430, the line relays 431 and 511 are deenergized when armatures 447 and 449 disengage their front contacts. This is the end of the first impulse.

As a result of the deenergization of relay 431, relay 429 deenergizes opening the energizing circuits for relays 425 and 426 and reclosing the energizing circuit for relay 428. The relay 428 is a sufficiently slow relay so that it remains energized during the brief interval while the relay 429 was energized.

The relay 303, upon energization, prepares a locking circuit for itself and relay 302 from negative battery through the winding of the relay 303, armature 324 and its front contact, through the winding of the relay 302, back contact and armature 325, and the front contact and armature 456, to positive battery. But this circuit is not effective at this time due to the direct positive battery obtained for the relay 303 at armature 434. At the end of the impulse period, however, when relay 429 deenergizes, as described above, this circuit becomes effective and relays 303 and 302 energize in series. As will appear from the following, relay 302 acts as a switch-over relay to switch the next impulse for operating the counting chain to the next counting chain relay 304. Relay 429, upon deenergization, opens the energizing circuit for the relay 425. This slow relay, after an interval of time, again permits its armature 445 to engage its back contact, whereupon the original energizing circuit for the relay 430 is again completed to transmit a second impulse. Relay 426 is slower than relay 425 and remains operated during intervals between impulses.

At the substation, in response to the energization of relay 511, an obvious energizing circuit is completed for the relay 509. Energization of the relay 509 completes an energizing circuit for the first counting relay 603 from positive battery over armature 533 and its front contact armature 534 and its front contact, armature 541 and its back contact, armature 629 and its back contact, armature 630 and its back contact, armature 631 and its back contact, through the winding of relay 603, to negative battery. Relay 603, upon energization, prepares a locking circuit for itself and relay 602 at armature 633 and this circuit extends through the winding of relay 602 over the back contact and armature 634 and front contact and armature 503a to positive battery. This circuit, however, is not at this time completed because of the fact that the original energizing circuit for relay 603 provides a short circuit around the relay 602.

The original energizing circuit for the relay 603 is multiplied over the conductor 660 and over break contact and armature 543 through the winding of the relay 514 to negative battery. Relay 514, upon energization, operates its make-before-break armature 543 and this relay is locked over armature 543. At armature 545 an energizing circuit is completed for the relay 515 from negative battery through the winding of the relay 515, front contact and armature 545, back contact and armature 546, back contact and armature 569 to positive battery.

A further result of the energization of relay 509 is to complete an energizing circuit for the relay 503 from negative battery through the winding of the relay 503, back contact and armature 536, back contact and armature 535, front contact and armature 534, and front contact and armature 533 to positive battery and to open the energizing circuit for the relay 508, but relay 508 is sufficiently slow so that it does not deenergize in the interval while the relay 509 is energized during impulses.

Energization of relay 503 completes an obvious energizing circuit for the relay 502 which in turn energizes the relay 501 and relay 501 in its turn energizes relay 500. By this time the first impulse has been terminated at the office end and relay 509 is deenergized, in turn deenergizing the relay 503 which is slow and remains operated between impulses and again closing the energizing circuit for the relay 508.

Deenergization of the relay 509 opens the original energizing circuit for the relay 603 and this relay 603 energizes in series with the relay 602 as described above.

At the office, as a result of the deenergization of relay 429, following the deenergization of relay 430, an energizing circuit is again completed for the relay 428 before this relay has had a chance to deenergize. At the same time, the energizing circuit for the relays 425 and 426 is opened at armature 434 which disengages its front contact. Relay 425 upon deenergization, again closes an energizing circuit for the relay 430 at armature 445 and its back contact. Relay 430 is thereupon energized to transmit a second signalling impulse energizing the line relay 429 at the office and line relay 509 at the substation.

As a result of the energization of relay 429 for a second time, an energizing circuit is completed for the next counting relay 304. This circuit extends over the circuit traced above for the first counting relay except that now armature 322 instead of engaging its back contact, engages its front contact and armature 326 is in engagement with its front contact so that the circuit extends to the relay 304. Relay 304, upon energization, prepares a locking circuit for itself and the relay 301 at armature 327. But this circuit is not effective at this time due to the original energizing circuit for the relay 304.

A further result of the energization of relay 429 is to again energize relay 425 which in turn opens the energizing circuit for the relay 430 at armature 445 to terminate the second impulse. Deenergization of the relay 430 in turn deenergizes relay 429 whereupon the locking circuit for relays 304 and 301 becomes effective.

In this manner, impulses are transmitted over the line successively energizing the counting relays 303, 304, 305, etc., these relays being successively energized under control of the switch-over relays 300, 301 and 302.

Relay 301, upon energization, opens the locking circuit for the relay 303 and 302 at the armature 325 which now disengages its back contact. The relays 303 and 302 are now deenergized. Upon the energization of relays 304 and 301 and upon the deenergization of relays 303 and 302, an energizing circuit is completed for the relay 418 from negative battery through the winding of the relay 418, armature 457 and its back contact, the front contact and armature 458, armature 266 and its front contact of the station code relay 241, conductor 267, conductor 161, the front contact and armature 329 of chain relay 304, front contact and armature 330, back contact and armature 331, back contact and armature 332, conductor 334, armature 459 and its back contact, and armature 404b and its front contact, to positive battery. Relay 418 is the station sending control relay which operates when the proper number of impulses for station selection have been transmitted and functions when energized to stop the transmission of further impulses. One of the effects of the energization of relay 418 is to operate make-before-break armature 457 to lock the relay 418 in energized position and at the armature 443 the circuit of relay 427 is opened and relay 427 is thereupon deenergized. The deenergization of relay 427 in turn opens the locking circuit for the relays 304 and 301 and these relays are now deenergized.

It will be noted that the relay 418 completed its energizing circuit over the armature of relay 241 which was energized in response to the key operation for controlling the station controlling code, and that this circuit was also completed over the armatures of relays 304 and 301 which were energized following the transmission of the correct number of station selecting impulses.

At the substation, it will be recalled that the last operation described was the deenergization of the relay 511 following the termination of the first signalling impulse. Upon the deenergization of the relay 511, the relay 509 is deenergized which again closes the energizing circuit for the slow relay 508 so that this relay 508, which was deenergized during the interval while the relay 509 was energized during the impulsing period, does not have time to deenergize during the impulsing interval and accordingly remains energized.

A further result of the deenergization of relay 509 is to open the energizing circuit for the relay 503 which, being a slow to deenergize relay cannot deenergize before relay 509 again energizes in response to the second impulse.

A further result of the deenergization of relay 509 is to open the original energizing circuit for the relay 603 and relay 603 now energizes in series with relay 602 over a self-locking circuit. This circuit extends from negative battery through the winding of the relay 603, the armature 633 and its front contact, through the winding of the relay 602, the back contact and armature 634, and front contact and armature 503a to positive battery. These operations occur at the end of the first impulsing period and before the second impulse, as described above, is impressed upon the trunk conductors.

At the substation, as a result of the energization of relay 509 in response to the second impulse received over the trunk conductors, the energizing circuit of relay 508 is again opened, but, as explained before, this relay is sufficiently slow in its operation so that it will not deenergize during this interval.

A further result of the energization of relay 509 is to complete an energizing circuit for the relay 503 over the circuit traced hereinbefore, and to complete an energizing circuit for the counting relay 604 from the negative battery through the winding of the relay 604, the armature 635 and its front contact, and front contact and armature 631, back contact and armature 630, back contact and armature 629, back contact and armature 541, front contact and armature 534 and the front contact and armature 533 to positive battery.

In the second impulse period the relay 511 is again deenergized when the impulse over the trunk conductors terminates. Deenergization of the relay 511 in turn deenergizes the relay 509. Relay 509 upon deenergization, again completes the energizing circuit for the relay 508 before this relay has had time to release and open the energizing circuit for the relay 503 which, being a slow to deenergize relay, will drop out after an interval of time, since no further impulses are received at this time.

A further result of the deenergization of relay 509 is to open the original energizing circuit for the relay 604 as traced hereinbefore. Relay 604 will now energize in a series locking circuit with relay 601 from negative battery through the winding of the relay 604, the armature 636 and its front contact, through the winding of the relay 601, back contact and armature 637 and the front contact and armature 503a to positive battery.

Energization of relay 601 opens the series locking circuit for the relays 603 and 602, which was previously traced, over the back contact and armature 634. Relays 603 and 602 are thereupon deenergized.

It will be recalled that following the transmission of the second impulse over the trunk conductors, further impulsing from the office was at this time stopped. Accordingly, a longer non-impulsing period will be obtained during which the relay 509 remains deenergized than is the normal period between the signalling impulses. Accordingly, relay 509 will be deenergized sufficiently long to permit relay 503 to deenergize. After an interval following the deenergization of relay 503, relay 502 is also deenergized.

A further result of the deenergization of relay 503 is to complete an energizing circuit for relay 787, the circuit extending from positive battery over the armature 537 and its back contact, armature 558 and its front contact, (relay 501 not having as yet dropped out), armature 547 and its back contact, armature 548 and its back contact, conductor 663, and through the winding of relay 787 to negative battery. It will be noted that this circuit is completed following the deenergization of relay 503 before relay 501 has had time to energize.

A circuit is now completed for relay 522 from negative battery through the winding of relay 522, conductor 638, armature 783 and its front contact, conductor 755, front contact and armature 640 of the counting relay 604 and thence to positive battery over the circuit already traced heretofore.

As the interval of non-impulsing continues, the relay 502 upon deenergization in turn opens the energizing circuit for the relay 501 which also deenergizes after an interval of time, the relay 501 in turn opens the energizing circuit for the relay 500.

A further result of the deenergization of the relay 502 is to open the energizing circuit for the series locking relays 604 and 601, and these relays deenergize.

As a result of the deenergization of relay 500, an energizing circuit is completed for the relay 507, from negative battery through the winding of the relay 507, back contact and armature 567, armature 549 and its front contact, armature 597 and its back contact, armature 581 and its back contact, to positive battery.

The relay 507 is a sending start relay and functions when energized to change the substation selecting apparatus from a receiving condition to a sending condition.

Transmission of the station selecting impulses is now completed and the apparatus is now about to send back to the office a check code to indicate the station selection which has been made.

Before explaining the check operations which are now about to be transmitted from the substation to the office to indicate the station selection which has been made, the function of the various relays which have been parts of the circuits described heretofore and the manner of their operations will again be explained with the aid of Figs. 11 to 16.

These figures are a diagrammatic illustration of the sequence and relative period of operation of the various relays. The numerals which appear along the top of these figures refer to the various relays and devices in the circuit diagram of Figs. 1 to 7. Along the left hand edge starting from the top are the legends indicating the successive operations which are performed during a selecting and operating period. Where a vertical line is shown beneath the numeral of a relay, it indicates that the particular relay is energized at that time and where no vertical line is shown, the relay is deenergized. The vertical lines are drawn on a scale to indicate the passing of time at a uniform rate. The length of a vertical line beneath a relay numeral, therefore, indicates the period of time during which the relay is energized. The horizontal lines emanating from the beginning and end of a vertical line indicate the effect caused by the energization or release of the relay. The operating or release time of the relay is represented by the short slanting line and the circuits affected by the operation of the relay are indicated by the arrow heads in the horizontal lines. This will be more clear from the following description made in connection with Figs. 11 to 13.

By following along the horizontal opposite the legend "Set Normal", it will be noted that a vertical line appears beneath the relay 428. This indicates that relay 428 is normally energized. Following along further, there is a further vertical line under the relay 110 which indicates that this relay is at this time energized and a further vertical line is found beneath the relay 490, indicating that this relay is also energized during the normal period.

Figure 11:
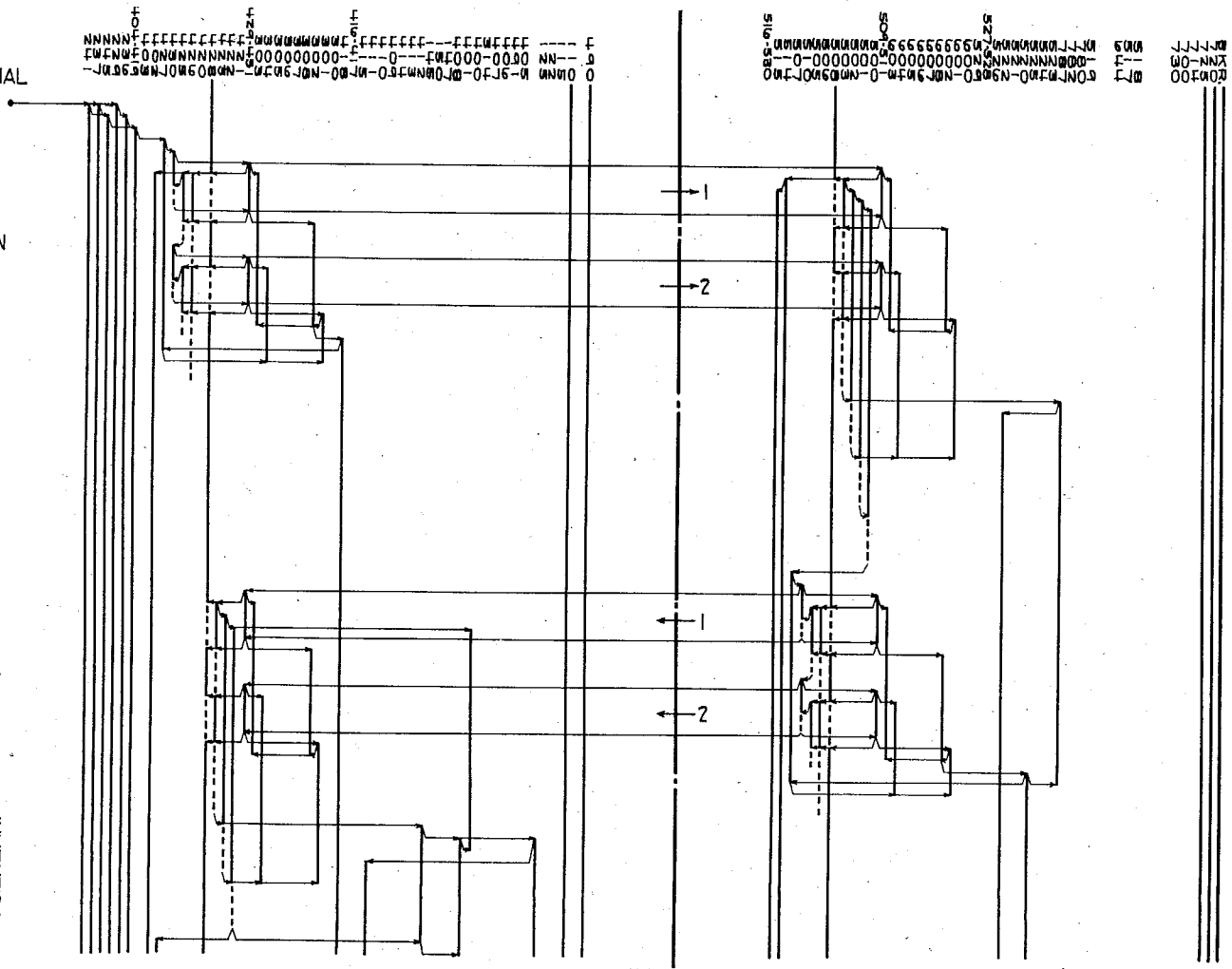
Figure 12:
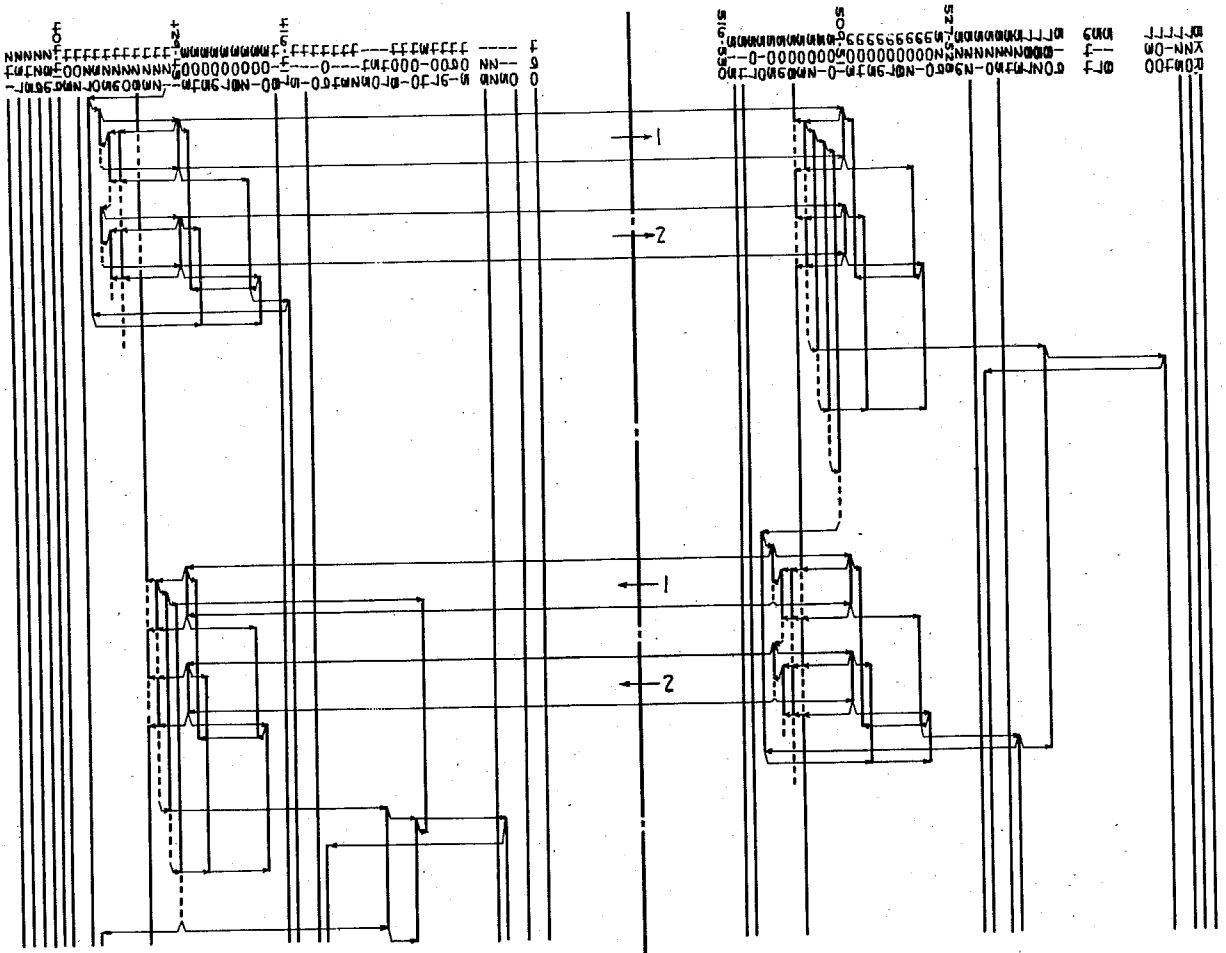
Figure 13:
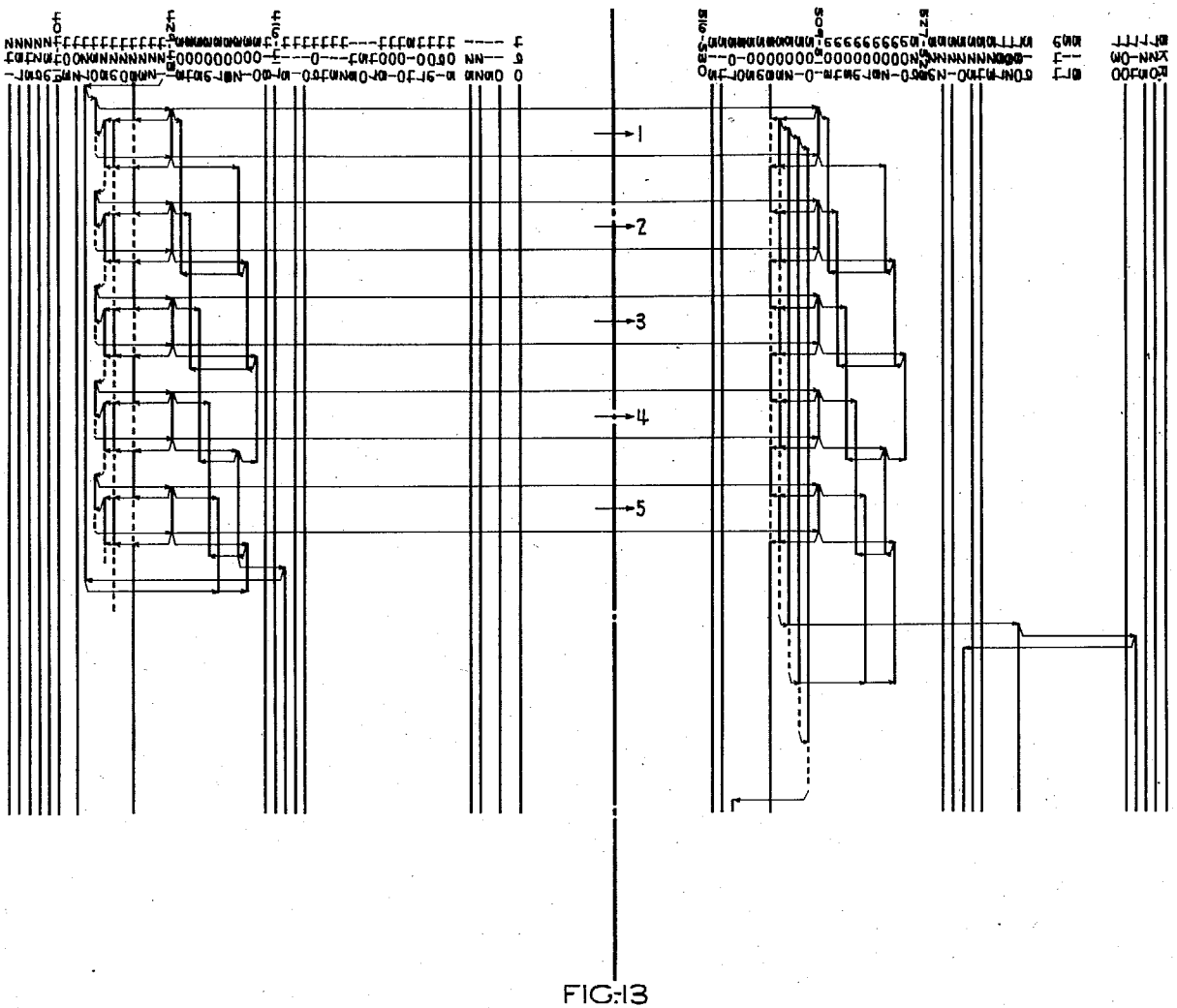
Figure 14:
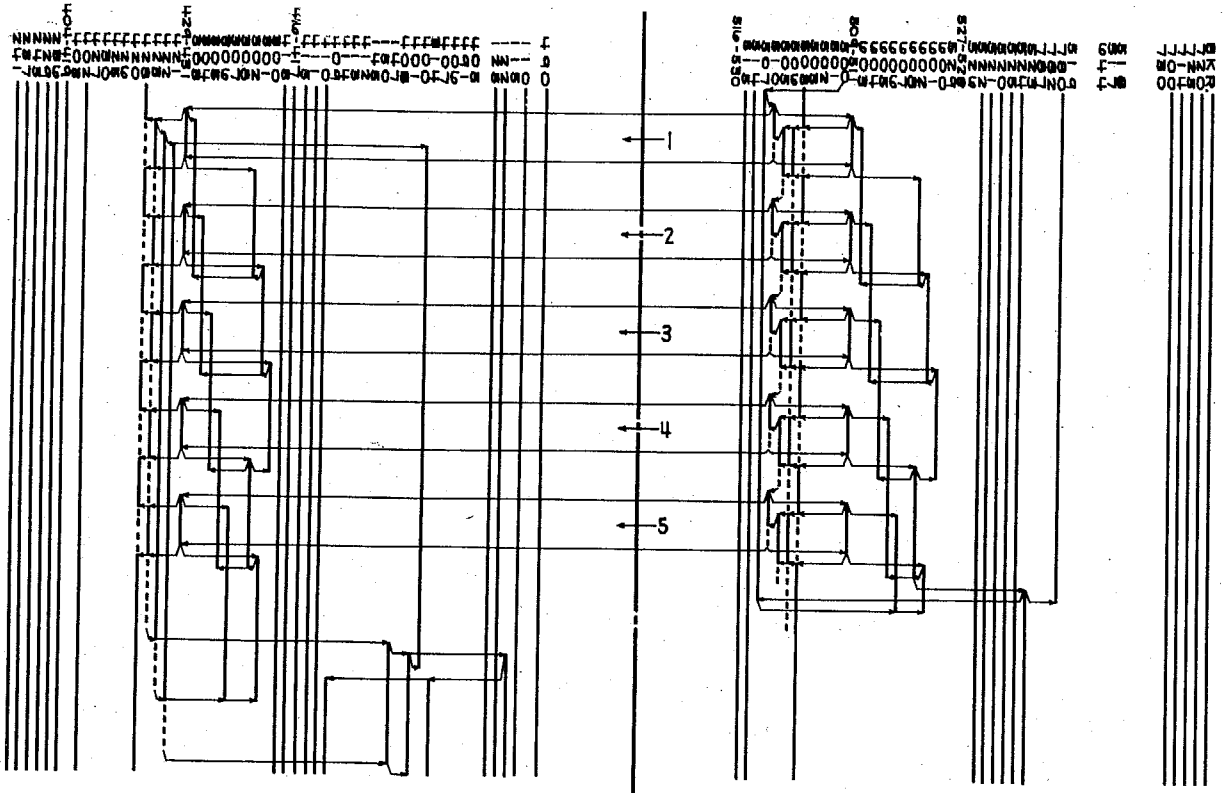
Figure 15:
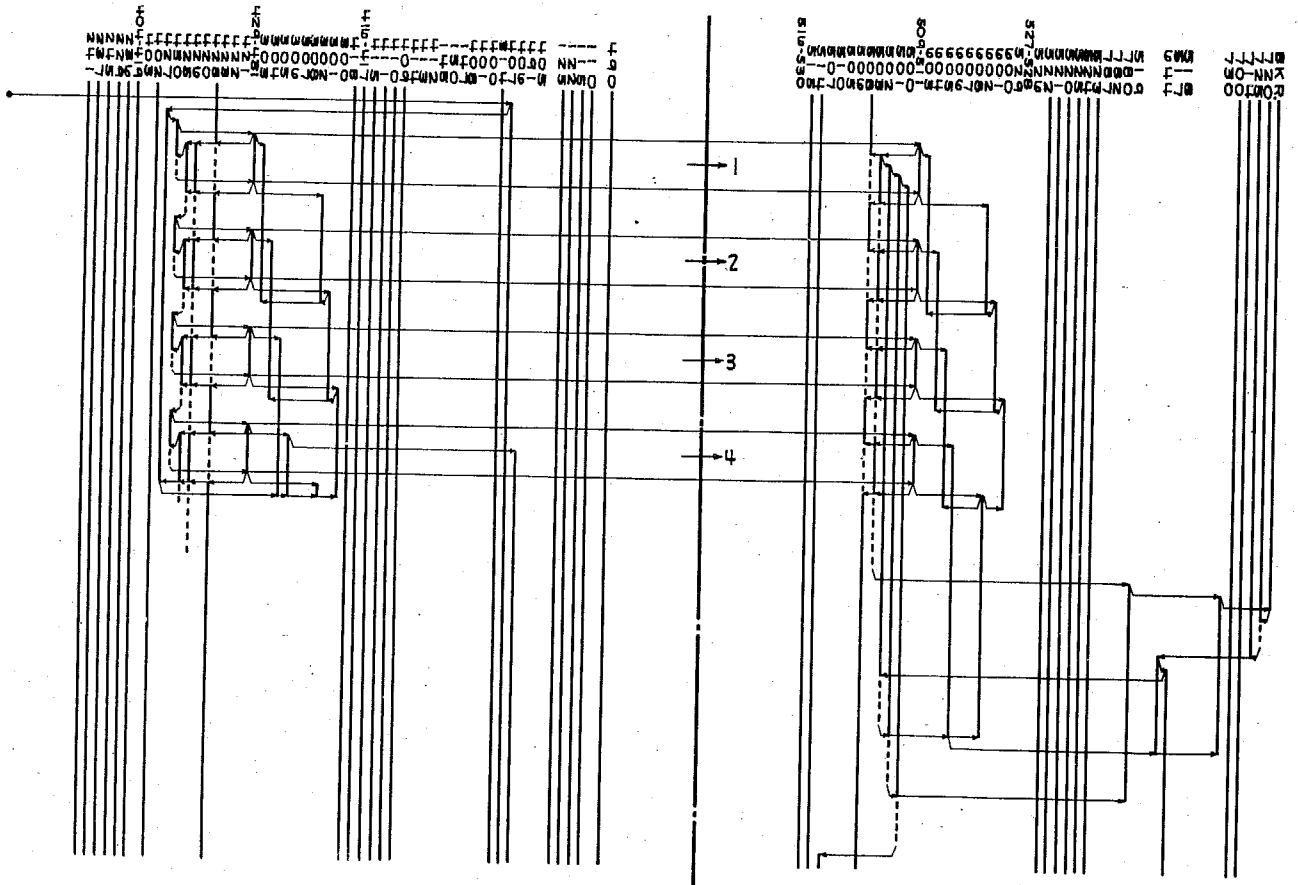
Figure 14:
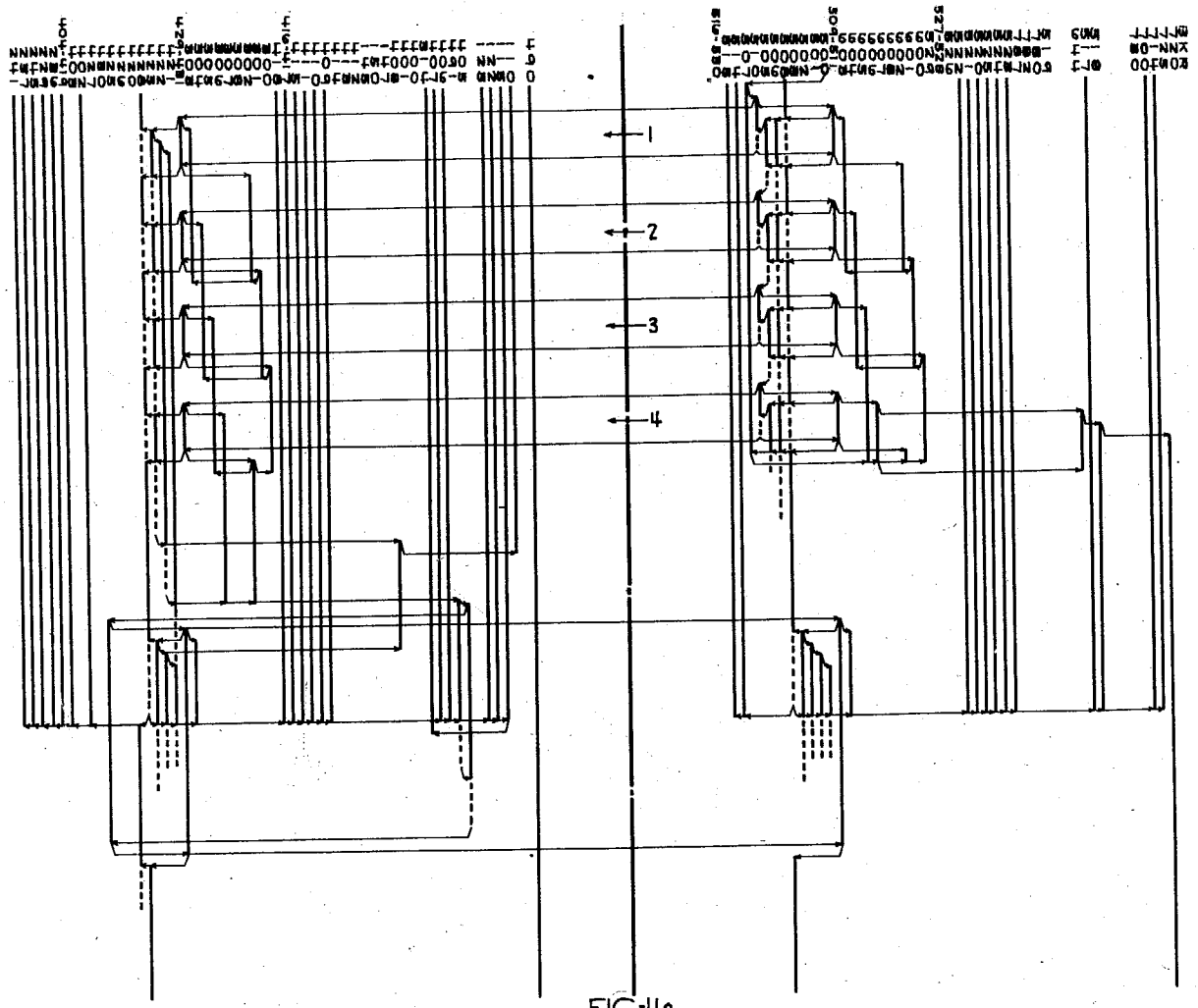

Following along further opposite the legend "Set Normal" and underneath the substation end on Fig. 11, a vertical line is found beneath the relay 508 indicating that this relay also is energized, as in the case of relay 428 at the office. A vertical line under relay 720 also indicates that it is energized. A vertical line under BKR also indicates that the breaker is closed.

When the operate key is depressed, the result of this action is that relay 241 for making a station selection, relay 237 for making a tens selection and relay 229 for making a unit selection are all energized as indicated by the arrows in the horizontal line opposite the legend "Operate Key Pushed." The vertical lines under these three relay numerals indicate that these relays will now remain energized during all of the selecting and operating periods. The horizontal line extending from the top of the vertical lines beneath the relays 241 and 237 indicates that, as a result of the operation of these relays, relay 245 is energized. This relay also, as shown by the vertical line, remains energized during the remaining operations to be described. The horizontal line extending from the top of the vertical beneath relay 229 indicates that as a result of the operation of relay 229, relay 236 is energized.

The energization of the relays 245 and 236 as indicated by the horizontal line extending from the top of these two vertical lines controls the energization of relays 404 and 419. These relays also, as will be noted from the vertical line, will remain energized thereafter during the remaining operations. Following the horizontal line from the top of vertical line 404—419, it will be noted that as a result of this energization of the start relays 404 and 419, relay 427 is energized. The vertical line beneath the relay 427 indicates that this relay remains energized only during the period while selecting impulses are being transmitted from the office.

The end of the vertical line indicates the deenergization of this relay.

Following again the horizontal line from relay 427, it will be noted that as a result of the energization of this relay, relay 430 is energized to control the transmission of the first impulse and as a result of which, as indicated by the horizontal line extending therefrom, relays 431 and 429 at the office, and relays 511 and 509 at the substation, are energized. The horizontal line extending from the office to the substation indicates the start of the first selecting impulse transmitted between the stations.

Energization of the relay 429 energizes the relay 303 as shown by the horizontal line extending from relay 429.

Relay 303 is one of the group of counting chain relays including relays 303 to 313. Relay 303, functions to count the first or blank step.

It will be noted that one other horizontal line extends from the relay 429 to the relay 428 and the dotted line beneath the arrow of relay 428 indicates that this relay circuit is opened at this point. However, as explained hereinbefore, although the circut for relay 428 is opened during the period indicated by the dotted line, this interval is not long enough to deenergize this relay, and relay 428 therefore remains energized. The dotted vertical lines indicate that the circuit of the relay is open, but that the relay remains operated owing to its slow releasing action.

Following the arrows to the left of the top of the vertical line for relay 428, it will be noted that as a further result of the energization of relay 429, relays 426 and 425 are energized. Relay 425 in turn, as indicated by the next arrow to the left, deenergizes the relay 430.

The relay 426 is a sending guard relay which connects the lock-out relay 424, the function of which will be explained hereinafter, to the contact of the line relay 429 for a brief period after the sending of impulses ceases upon the release of relay 427. This function is to energize the lock-out relay 424 in case both ends of the system should accidentally attempt to transmit impulses simultaneously. This operation will be made clear hereinafter.

Referring again to the arrow further to the left from the top of line 425, it will be noted that the energization of this relay completes an energizing circuit for the relay 402. This relay also, it will be noted from the vertical line, thereafter remains energized during the remaining operations to be described.

Referring now to the effect of the operation at the substation end, it will be noted that upon the energization of relays 511 and 509, relay 508 was open circuited, as indicated by the dotted lines beneath the first arrow, but, as explained hereinbefore, this relay is of the slow type and the interval shown by the dotted line is too short to permit this relay to drop out.

Relay 503 is also energized as a result of the energization of relay 509 as is the relay 603. All of these relays have their counterparts at the office end, the functions of which have all been fully described.

Energization of the relay 509 furthermore causes the energization of relay 514 at the substation, which is a start preventing relay and which operates in response to the first received impulse to prevent the energization of the start relays 516 and 530. It will be noted that these two relays complete their energization circuit over the armature 534 of relay 514, so that when this relay is energized the circuit for the start relays is opened. Energization of the relay 514 in turn completes an energization circuit for the relay 515. As indicated by the vertical line beneath these relays, they will remain energized during the remaining operations. Relay 515 being a receiving relay operates to determine that the substation is to be the receiving end.

Energization of the relay 503 in turn controls the energization of the relays 502, 501 and 500 which relays are the receiving sequence relays and which operate only when impulses are being received from the office end of the line. When there is a cessation of the code impulses, these relays as described hereinbefore, release successively and control the sequence of local functions, following the transmission of the second impulse.

Termination of the first impulse is caused by the release of relay 430 and indicated by the arrow beneath the relays 509 and 511, but before this will be described, its effect at the office end will first be considered.

Referring then to the chart for the office end, it will be noted from the dotted line extending beneath the second arrow under the relay 430 that one effect of the deenergization thereof is to deenergize relays 431 and 429. Deenergization of these two relays in turn will again complete the energization circuit for the relay 428 and open the energizing circuit for relays 426 and 425, and also will complete an energizing circuit for the relay 302 in series with the relay 303.

The deenergization of relay 425 again closes the energizing circuit for the relay 430, which thereupon transmits a second impulse over the line indicated by the third horizontal line extending between the stations; the second horizontal line indicates the termination of the first impulse. Before describing the effect of the second impulse, the result of the termination of the first impulse at the substation, will be explained.

The termination of the first impulse results in a deenergization of relays 511 and 509, as a result of which relay 602 is energized in series with relay 603, the circuit for relay 503 is opened and relay 508 again has an energizing circuit.

Referring again to the office end; the energization of the relay 430 for the transmission of the second impulse again energizes relays 431 and 429 at the office and relays 511 and 509 at the substations. Energization of relay 429 at the office completes an energizing circuit for the second counting relay 304 by reason of the energization of relay 302. The energizing circuit for relay 428 is again opened but the open period is again too short to deenergize this relay. Relays 426 and 425 are again energized, the latter in turn deenergizes relay 430 to terminate the second impulse. The termination of the second impulse again deenergizes relays 431 and 429 at the office as a result of which the second switching relay 301 is energized and relay 301 upon energizing, opens the energizing circuit for relays 302 and 303.

A further result of the deenergization of relay 429 is to again close the energizing circuit of relay 428 and to deenergize relays 426 and 425.

Energization of the second counting relay 304 and the deenergization of switching relay 302 completes an energizing circuit for the relay 418. Relay 418 upon energization opens the energizing circuit for the relay 427 to prevent further energization of relay 430 at this time. The deenergization of relay 427 in turn deenergizes the relays 304 and 301 restoring the selecting apparatus at the office to normal.

At the substation the receipt of the second impulse energizing the relays 511 and 509, causes the energization of the second counting chain relay 604 and the completion again of an energizing circuit for the relay 503 and the opening of an energizing circuit for the relay 508. At the end of this second impulse interval relay 509 deenergizes completing an energizing circuit for the second switching relay 601, which in turn opens the energizing circuit for the relays 603 and 602.

A further result of deenergization of relay 509 is to open the energizing circuit for the relay 503 and close the energizing circuit for the relay 508.

It will be recalled that following the second impulse, further transmission of the impulses from the office end has been stopped by the deenergization of relay 427. After an interval of time, relay 503 deenergizes, in turn energizing the station selecting relay 787 which closes a temporary locking circuit for itself over armature 788 and its front contact, conductor 664, front contact and armature 515*a*, back contact and armature 555 to positive battery. In the illustration shown, the armature 783 is shown strapped to the conductor 788 so that if two impulses are received for the station selected, resulting in the energization of relay 604 as described above, which is connected to armature 788, a circuit is extended to the relay 522 which indicates the selection of this particular substation. If on the other hand, this station were to be locked out, another of these armatures than that illustrated, would be strapped to perform the locking out operation. Relay 503 deenergizing also opens the circuit of relay 502 which causes the release of relays 604 and 601.

After a further interval of time following the deenergization of relay 502, relay 501 is deenergized and this relay in turn after an interval of time, deenergizes the relay 500. Relay 500 in turn upon deenergization completes an energizing circuit for the relay 507, whereby the apparatus at the substation starts to function for transmitting a check code back to the office to indicate the particular station which has been selected for operation. The detailed description of these operations will now be given in connection with Figs. 1 to 7.

As a result of the energization of relay 507 at the substation in the manner described above for the transmission of check signals back to the office, an energizing circuit is completed for the relay 510 from negative battery through the winding of relay 510, the back contact and armature 574, and the front contact and armature 575 to positive battery.

Energization of relay 510 operates armatures 577 and 553 to engage their front contacts and to impress a signalling impulse upon the trunk conductors extending between the stations.

In response to this first check impulse, the relays 511 and 509 at the substation are energized. As a result of the energization of relay 509 an energizing circuit is completed for the first counting relay 603 over the circuit which has been described in detail hereinbefore. At the same time the circuit for the relay 508 is opened but this relay is not deenergized for the reason explained hereinbefore.

Simultaneously, energizing circuits are completed for the relays 505 and 506. Energization of the relay 505 in turn opens the energizing circuit for the relay 510, thus completing the first impulsing period.

At the dispatcher's office in response to the first impulse received, the relays 431 and 429 are energized. In response to the energization of relay 429 an energizing circuit is completed for the first counting relay 303 and at the same time the energizing circuit for the relay 428 is opened, but as explained hereinbefore the relay 428 is sufficiently slow so that it will not drop out at this time. A still further result of the energization of relay 429 is to complete an energizing circuit for the relay 423. It will be recalled that in the period during the transmission of the station selecting impulses the relay 427 was energized before the first energization of relay 429 so that no circuit was completed for the relay 423 at the office. In the present case, however, relay 427 is, deenergized and, accordingly, an energizing circuit is now completed for the relay 423.

Relay 423 in conjunction with the relays 422 and 421 comprise the receiving sequence relays and operate only when impulses are received from the substation end. After the cessation of impulses these relays are released in sequence and control the sequence of local functions.

The relay 423, which is energized over a circuit including the back contact and armature 462, back contact and armature 455 front contact and armature 452, and the front contact and armature 434, in turn controls an energizing circuit for the relay 422 which in turn energizes relay 421.

As a result of the energization of relay 422 an energizing circuit is completed for the relay 400 from negative battery, through the winding of relay 400, the armature 470 and its front contact, armature 401*a* and its back contact, make-before-break armature 400*a* and its back contact, and the front contact and armature 422*a* to positive battery. The relay 400, upon energization locks itself over its own make-before-break armature 400*a* and its front contact.

At the substation, as a result of the termination of the first check impulse due to the deenergization of relay 510, as described hereinbefore, the relays 511 and 509 are deenergized. As a result of the deenergization of the relay 509, the energizing circuit for the relay 508 is again closed and a circuit is completed for the first switching relay 602 in series with the first counting relay 603. As a further result of the deenergization of relay 509 the circuits for relays 505 and 506 are opened. As a result of the deenergization of the relay 505, an energizing circuit is again completed for the relay 510 which thereupon energizes to transmit the second check impulse back to the office.

At the dispatcher's office following the termination of the first check impulse, an energizing circuit is again completed for the relay 428 and the circuit for the relay 423 is opened, but this relay does not have time to deenergize during the interval between the termination of the first check impulse and the starting of the second check impulse. A further result of the termination of the impulse and deenergization of relay 429 is to complete an energizing circuit for the first switching relay 302 which energizes in series with the relay 303 in the manner which has been described in detail heretofore.

At the substation, as a result of the energization of relay 510 for the transmission of the second impulse and the resulting energization of relay 509, an energizing circuit is completed for the second counting relay chain 604. A further result is the opening of the energizing circuit for the relay 508 as described heretofore but which has no effect and the energization of relays 506 and 505.

The energization of relay 505 in turn again opens the energizing circuit for the relay 510 thus terminating the transmission of the second check impulse. At the dispatcher's office, in response to the receipt of the second check impulse, the relay 429 is against energized and in turn opens the energizing circuit for the relay 428 and completes an energizing circuit for the relay 423. A further result of the energization of relay 429 is to complete an energizing circuit for the second counting relay chain 304 at the office.

Removing energy from the trunk conductors for the termination of the second impulse causes the deenergization of the relay 509 at the substation. As a result of the deenergization of the relay 509, the energizing circuit for the relay 508 is again closed and the energizing circuits for the relays 505 and 506 are opened.

As a further result of the deenergization of relay 509 at this time, an energizing circuit is completed for the relay 601 which energizes in series with the relay 604 and in turn opens the energizing circuits for the relays 603 and 602. These two relays thereupon deenergize. Upon the deenergization of the relay 602 and as a result of the energization of relay 604, an energizing circuit is completed for the relay 525 from negative battery through the winding of the relay 525, back contact and armature 550, back contact and armature 551, back contact and armature 552, back contact and armature 568, armature 632 and its back contact, armature 638 and its back contact, armature 639 and its front contact, armature 640 and its front contact, front contact and armature 783, conductors 788 and 638, and the front contact and armature 554 to positive battery.

As a result of the energization of relay 525, the locking circuit of station selecting relay 787 is opened at the armature 555 and at the same time the relay 525 locks itself over armature 555. A further result of the energization of relay 525 is to open the energizing circuit for the relay 507 at armature 597 and this relay deenergizes. As a result of the deenergization of relay 507 the energizing circuits for the relays 604 and 601 are opened and these relays are deenergized.

A further result of the deenergization of relay 507 is to prevent the transmission of further checking impulses at this time. At the office end, as a result of the termination of the second checking impulse the relay 429 is deenergized, again completing the energizing circuit for the relay 428 and opening the energizing circuit for the relay 423.

A further result of the deenergization of relay 429 is to complete an energizing circuit for the switching over relay 301 which energizes in series with the relay 304 and which opens the series energizing circuit for the relays 302 and 303.

An interval after the deenergization of the relay 423 sufficiently long to permit the deenergization of relay 422, this relay deenergizes and following the deenergization of relay 422 after a sufficient interval of time, relay 421 deenergizes. It will be recalled that during this period no further checking impulses are being received from the substation.

As a further result of the deenergization of relay 423, an energizing circuit is completed for the relay 145, the circuit extending from negative battery through the winding of this relay, conductor 350, back contact and armature 464, back contact and armature 465, front contact and armature 466, and the back contact and armature 423a to positive battery.

This circuit is completed during the period following the deenergization of relay 423 and before the relay 421 has had time to deenergize in response thereto.

Energization of the relay 145 in turn completes an energizing circuit for the relay 401 from negative battery through the winding of the relay 401, conductor 351, the front contact and armature 155, conductor 352, front contact and armature 458, armature 266 and its front contact, conductor 267, conductor 161, and the front contact and armature 329 of relay 304 which it will be recalled is the second counting relay chain energized, front contact and armature 330, back contact and armature 331, the back contact and armature 332, conductor 334, armature 459 and its front contact to positive battery.

As a result of the energization of relay 401, the energizing circuit for the relay 400 is opened at armature 401a which disengages its back contact.

From the above description it will be noted that the relay 401 was energized over a circuit which included a contact of the energized station selection relay 241 and of the counting relay 304. Relay 401 therefore functions as a check code responsive relay, which operates when the proper station selection has been checked and in turn functions to release the check control relay 400.

The check control relay 400 operates when the office is the originating end and impulses are being received from the substation for checking the selection. If the station, group, or point selection check impulses received from the substation do not agree with those sent from the office for making a selection, the relay 401 will not energize in the manner described above, and, accordingly, will not deenergize the relay 400. Relay 400 will therefore remain energized and in that event the office selecting apparatus will operate through the entire counting chain and restore the set to normal by energizing the release start relay 491 in a manner described hereinafter.

In multiple with the circuit traced above for the relay 401, an energizing circuit is completed for the relay 125 from negative battery through the winding of relay 125, armature 152 and its front contact, conductor 161, over the front contact and armature 329 and thence over the circuit is traced above.

Relay 411 is thereupon energized over a circuit from negative battery through the winding of relay 411, conductor 353, armature 130 and its front contact, armature 152 and its front contact and thence to positive battery over the circuit as traced above for relay 125.

Relay 411 upon energization locks itself over its armature 411a and its front contact and at this same armature provides a locking circuit for the relay 125 over armature 130 and its front contact, conductor 353 to armature 411a and its front contact. The relay 411 is the station switching relay.

As a further result of the deenergization of relay 422, the series locking circuit for the relays 304 and 301 are opened at armature 422b and these relays are deenergized.

Following the deenergization of relay 421 in the manner described above, at a sufficient period after the last check impulse has been received, the circuit for the relay 145 is opened at the armature 466 which disengages its front contact. This relay therefore deenergizes in turn opening the energizing circuit for the relay 401 which thereupon also deenergizes.

A further result of the deenergization of the relay 421 is to complete an energizing circuit for the relay 427 over the circuit traced hereinbefore, including the back contact and armature 441, armature and front contact 475, back contact and armature 479, back contact and armature 416a to positive battery.

Relay 427 thereupon energizes and in turn completes an energizing circuit for the relay 430, as described in detail hereinbefore. Impulses are then transmitted over the signalling trunks 432 and 433 in the manner described in detail above, which therefore needs no further repeating. The sequence of these operations is diagrammatically illustrated in Figs. 11 to 13.

As in the case of the station selection, two impulses are transmitted for making a group selection. At the end of the transmission of the two impulses, relays 416 and 417 are energized. It will be recalled that following the transmission of the two impulses for making the station selection, relay 418 was energized to stop further impulsing. The same function is now performed by the relays 416 and 417 which operate over a circuit now to be described following the transmission of a group selection to stop further impulses.

This circuit is completed from negative battery through the windings of these two relays over the make-before-break armature 416b and its back contact, the front contact and armature 467, front contact and armature 468, conductor 354, front contact and armature 131, armature 274 and its front contact, conductors 267 and 161, front contact and armature 329, front contact and armature 330, back contact and armature 331, back contact and armature 332, armature 459 and its back contact, and armature 494b and its front contact to positive battery.

It will be noted that this circuit is completed through the armature 274 of relay 237, which is the group selecting relay and through the armature 329 of the counting relay 304, which is operated following the operation of the correct number of impulses.

At the substation in response to this group of impulses for making a group selection, relay 782 is energized from negative battery through the winding of this relay, conductor 665, over the back contact and armature 556, back contact and armature 557, front contact and armature 548, back contact and armature 547, front contact and armature 558 and the back contact and armature 537 to positive battery.

This circuit, it will be noted, is completed following the receipt of the two group selecting impulses at an interval of time, during which the slow to deenergize relay 503 has had time to drop its armature to its back contact, but before the relay 501 has similarly dropped its armature.

Relay 782 closes a temporary locking circuit for itself over armature 790 and its front contact, conductor 666, front contact and armature 515b, back contact and armature 524b to positive battery.

As a result of the energization of the relay 782, group selecting relay 700 is energized from negative battery, through the winding of this relay, over armature 781 and its front contact, front contact and armature 640 of the second counting chain 604, which is at this time energized, front contact and armature 639 of the switch relay 601, which is at this time energized, back contact and armature 638, back contact and armature 632 and armature 568 and its front contact to positive battery.

As a result of the energization of relay 700, an energizing circuit is completed for relay 521 from negative battery through the winding of relay 521, conductor 670, and the front contact and armature 743 to positive battery over the circuit traced above for the relay 700.

Relay 521 upon energization locks itself over its armature 559 and this same armature completes a locking circuit for the group relay 700. The relay 521 is the group switching relay which operates when the group relay has been selected and prepares the apparatus at the substation for the transmission of the check signals to indicate the group selection. As in the case of the station selection, a sufficient interval of time after the last selecting impulse has been received, relay 500 deenergizes completing an energizing circuit for the relay 507 and check impulses are thereupon transmitted back to the office to indicate the group selection which has just been completed at the selected substation.

The checking impulses, which again are two in number, are terminated following the transmission of two impulses, upon the energization of relay 524, the circuit for which extends from negative battery through the winding of relay 524, front contact and armature 550, back contact and armature 551, back contact and armature 552, back contact and armature 568, armature 632 and its back contact, armature 638 and its back contact, armature 639 and its front contact, armature 640 and its front contact of the counting relay 604, front contact and armature 781, front contact and armature 743, conductor 670 and the front contact and armature 559 to positive battery.

It will be noted that this circuit is completed over the second relay 604 of the counting chain which is energized following the transmission of the second checking impulse.

Energization of relay 524 opens the energizing circuit for the relay 507 which was previously completed over the armature 560 and its front contact and the back contact and armature 561. Upon the deenergization of relay 507 further impulsing is stopped.

At the office, upon receipt of the two checking impulses, the group selecting relay 150 is energized over a circuit from negative battery through the winding of this relay, conductor 355, back contact and armature 469, back contact and armature 415a, front contact and armature 465, front contact and armature 466, and the back contact and armature 423a to positive battery. This circuit, it will be noted is completed an interval of time after receipt of the last check impulse which is sufficient to permit the relay 423 to drop its armature to the back contact, but before the relay 421 can drop its armature to its back contact.

As a result of the energization of relay 150, an energizing circuit is completed for the group selecting relay 122 from negative battery through the winding of this two relay armature 132 and its front contact, armature 153 and its front contact, conductor 161, front contact and armature 329 and thence to positive battery over the circuit which has been traced hereinbefore.

As a result of the energization of relay 122, an energizing circuit is completed for the relay 410 from negative battery though the winding of relay 410, conductor 356, the armature 133 and its front contact, and thence to positive battery over the circuit traced for relay 122.

Relay 410 upon energization locks itself over its armature 471 and completes a locking circuit for the relay 122 over this same armature.

Thereafter, following the deenergization of relay 421, the apparatus is now again set into operation transmitting the last group of impulses which are the final or point selecting impulses. In the present case it is assumed that five such impulses are transmitted in accordance with the set-up made at the office. These impulses are transmitted in a manner which has already been described in detail hereinbefore, the counting chain relays 303, 304, 305, 306, and 307 being energized in sequence during the transmission of each of these impulses. At the substation in response to receipt of these impulses, counting chain relays 603, 604, 605, 606 and 607 are energized in sequence.

When the fifth counting chain impulse has been transmitted, an energizing circuit is completed for the relay 415 from negative battery through the winding of relay 415, the make-before-break armature 472 and its back contact, through the front contact and armature 473, front contact and armature 474, conductor 357, front contact and armature 134, armature 275 and its back contact, armature 276 and its back contact, armature 277 and its back contact, armature 278 and its front contact of the point code relay 259, conductor 162, front contact and armature 340 of counting chain relay 307, front contact and armature 330, back contact and armature 331, back contact and armature 332 and over conductor 334 to postiive battery over the circuit traced herinbefore.

Relay 415 functions like relays 416, 417 and 418 to stop the transmission of further point selecting impulses following the transmission of the correct number of such impulses. At the substation upon receipt of the last point selecting impulse, counting chain relay 607 is energized.

An interval of time after receipt of the last point selecting impulse sufficiently long to permit the relay 503 to drop its armature to its back contact, but before the relay 501 can drop its armature to its back contact, an energizing circuit is completed for the point selecting relay 780 from negative battery through the winding of this relay, conductor 667, back contact and armature 580, front contact and armature 556, back contact and armature 557, front contact and armature 548, back contact and armature 547, and the front contact and armature 558 and back contact and armature 537 of relay 503 to positive battery.

Relay 780 closes a temporary locking circuit for itself.

As a result of energization of relay 780, an energizing circuit is completed for the point selecting relay 714 from negative battery through the winding of relay 714, armature 744 and its front contact, armature 791 and its front contact, front contact and armature 643 of counting relay 607, front contact and armature 633, back contact and armature 630, back contact and armature 632 and armature 568 and its front contact to positive battery.

Relay 520 is thereupon energized over a circuit from negative battery, through the winding of relay 520, conductor 671 and the front contact and armature 745 of relay 714 to positive battery over the circuit traced above for relay 714. As a result of energization of relay 520, a locking circuit is completed therefor at the armature 579. This also provides a locking circuit for the relay 714. Circuits are now prepared over the armatures 747 to 749 of relay 714 for operation and supervision of the associated breaker.

Energization of relay 520 again completes an energizing circuit for the relay 507 following the release of relay 500 over armature 567, armature 562 and its front contact, the back contact and armature 563, and the back contact and armature 564 to positive battery. Relay 507 upon energization starts the transmission of the check code back to the dispatcher's office in a manner which has been described in detail hereinbefore and which is diagrammatically illustrated in the charts shown in the Figs. 11 to 13.

Five impulses are transmitted back to the office in accordance with the point selection made at the substation While these impulses are being transmitted back to the office, the counting chain is again operated, energizing the relays 303, 304, 305, 306 and 307, in sequence.

At the substation, upon the transmission of the last impulse, an energizing circuit is completed for the relay 523 from negative battery, through the winding of relay 523, over the front contact and armature 551, back contact and armature 552, back contact and armature 568, armature 632 and its back contact, armature 630 and its back contact, armature 639 and its front contact, armature 643 and its front contact of counting chain relay 607, front contact and armature 791, front contact and armature 744 of relay 700 and armature 745 and its front contact of relay 714 to positive battery as traced hereinbefore.

Relay 523 upon energization, locks itself over its armature 565 and at armature 563 opens an energizing circuit for the relay 507.

The manner in which impulses are transmitted and stopped both for the selection and check are now obvious. Thus, it will be noted that the relay 507 at the substation, which controls the transmission of the checking impulses, is provided with three multiple circuits over which it may be energized. These circuits include the armature 549 and its front contact, armature 560 and its front contact and armature 562 and its front contact. Armature 549 is controlled by the relay 522 which, it will be recalled, was energized following the receipt of the station selecting impulses, thus starting the transmission of station check impulses. Armature 560 is controlled by the relay 521 which was energized following the receipt of group selection impulses, and armature 562 is controlled by the relay 520 which is energized following receipt of the point selection impulses.

Similarly, the same relay 507 is deenergized by armatures 597, 561, 563 of the relays 525, 524 and 523, respectively.

The relay 525 it will be recalled is energized following the transmission of the last check impulse indicating the station selection, and, at its armature 597 opens a circuit for the relay 507 to terminate the transmission of such impulses.

Relay 524 was energized following the transmission of the group selection check impulses, and, at armature 561, opens a circuit for relay 507 and finally, relay 523 was energized following the point selecting check impulses to open the circuit of the relay 507 at armature 563.

The control of the transmission and stopping of the selecting and checking impulses at the dispatcher's office is effected in a similar manner when the system is started into operation from the substation. In this instance the relay 427 is energized over the armatures 475, 476, and 477 of relays 411, 410 and 409 respectively, and is deenergized at armatures 479, 478 and 485 of relays 414, 413 and 412 respectively.

Now the last checking impulse is transmitted from the substation in the manner described hereinbefore.

The point selection control relay 147 is energized an interval of time following the receipt of the last impuse which is sufficiently long to permit the relay 423 to drop its armature 423*a* to its back contact, but before the relay 421 can similarly drop its armature. This circuit extends from negative battery through the winding of relay 147, conductor 358, the back contact and armature 430, front contact and armature 469, back contact and armature 415*a*, front contact and armature 464, back contact and armature 465, front contact and armature 466, and back contact and armature 423*a* to positive battery. Relay 147 upon energization completes an energizing circuit for the relay 115 from negative battery through the winding of relay 115, the armature 160 and its front contact, armature 163 and its front contact, front contact and armature 340 of counting relay 307, front contact and armature 330, back contact and armature 331, back contact and armature 332, and over conductor 334 to the armature 459 of relay 421 and its front contact to positive battery.

As in the case of the checking for the station and group selection, the relay 400 was energized at the beginning of point check. Now, at the termination of the point check, relay 401 energizes and in turn opens the energizing circuit for the relay 400. As a result of energization of relay 115, an energizing circuit is completed for the relay 409, from the negative battery, through the winding of the relay 409 over the conductors 460 and 285, the front contact and armature 136 to positive battery over the circuit traced for relay 115. Energization of relay 409 operates its armature 481 to engage its front contact, providing a locking circuit for the relay 409 and for the point selecting relay 115.

The check impulses have now indicated that the station, group and point selection which have been made at the substation are in accordance with the code which was transmitted. In multiple with relay 115, an energizing circuit is also now completed for the lamp 101 which is thereupon illuminated to indicate to the dispatcher the selection which has been made.

The dispatcher will now operate his master control key 211 to transmit a code for operating the selected breaker in the selected group and station to the desired position. To this end he will first operate the control key 103 for tripping the breaker. This closes a circuit for relay 314 over contact 105 of key 103 and front contact and armature 164. Then, upon depression of key 211, an energizing circuit is completed for the relay 407, which is the control key relay operating in response to the master control key operation, over a circuit from negative battery through the winding of relay 407, through the contact 212 of the master control key 211 and over the front contact and armature 136 to ground over the circuit described heretofore for relay 115.

Relay 407 upon energization, locks itself over its armature 407*a* and its front contact, to positive battery on armature 481, and at armature 407*b* completes an energizing circuit for the relay 427 which circuit, coming over armature 477 and its front contact, is extended over the back contact and armature 406*a* and the back contact and armature 485 to positive battery.

Relay 427 upon energization starts the transmission of operation control impulses, which for the desired circuit breaker operation is in the present case four impulses in number. The transmission of these impulses is accomplished in exactly the same manner as those for the selection and similarly causes the energization of the counting relay chain.

To stop the transmission of the impulses for making a trip operation, the relay 406 is energized, as soon as counting relay 306 operates, over a circuit from negative battery, through the winding of relay 406, front contact and armature 416*c*, front contact and armature 483, conductor 425*a*, front contact and armature 342, front contact and armature 359, conductor 360, and the front contact and armature 484 to positive battery.

Relay 406 upon energization opens the circuit for relay 427 but this relay still has an energizing circuit over armature 461 and its front contact, and front contact and armature 446, in order to prevent the mutilation of the fourth impulse. At the end, however, of the fourth impulse, relay 429 deenergizes, whereupon the relay 427 is deenergized to terminate the transmission of the operation control impulses to the substation. Upon receipt of the last of the operation control impulses at the substation, relay 503 deenergizes after an interval of time in the manner which has already been described in connection with other operations.

An energizing circuit is now completed for the relay 519 from negative battery through the winding of relay 519, the front contact and armature 578, front contact and armature 580, front contact and armature 556, back contact and armature 557, front contact and armature 548, back contact and armature 547, the front contact and armature 558 and the back contact and armature 537 to positive battery.

The relay 519 upon energization completes an energizing circuit for tripping the breaker over a circuit from positive battery over armature 566 and its front contact, conductor 519*a*, armature 661 and its front contact, conductor 662, armature 749 and its front contact and through the trip magnet 730 to negative battery.

As a result of the energization of the trip magnet 730, the circuit breaker associated therewith is operated to its trip position.

Supervisory signals are now to be sent back to the office indicating the tripped condition of the breaker. One of the results of the operation of the breaker to its tripped condition is to complete an energizing circuit for the relay 644 from positive battery over the front contact and armature 645, through the winding of the relay 644, conductor 650, armature 747 and its front contact, armature 750 and its back contact of the relay 720 which has been open-circuited, as the result of the tripping of the breaker, to negative battery.

One further result of the deenergization of relay 720 is to momentarily open the locking circuit for the relay 725 as the armature 739 moves from its front to its back contact. The resultant deenergization of relay 725 has no effect for the present although in the case of operations at the substation, due to an automatic operation of a breaker, the deenergization of relay 725 would function to start the apparatus into operation in a manner which will be described hereinafter.

As a result of the energization of relay 644, an energizing circuit is completed for the relay 517 from negative battery through the winding of relay 517, front contact and armature 570, back contact and armature 571, conductor 505*a* and the front contact and armature 650 to positive battery. Relay 517 closes a locking circuit for itself over armature 517*a* to positive battery.

The energization of the relay 517 opens the locking circuit for the relay 502 which was previously completed following the operation control impulses over the armature 572 and its front contact, the back contact and armature 573, the front contact and armature 563 and the back contact and armature 564.

Relay 502 is thereupon deenergized and in turn deenergizes the relay 501 which in turn restores the counting chain to its normal condition. Upon deenergization of the counting chain, relay 644 and the tripping magnet 730 are also deenergized.

As a result of the deenergization of relay 501, an energizing circuit for the relay 500 is opened and the circuit for the relay 519 is also opened and this relay is deenergized. The deenergization of relay 500 completes an energizing circuit again for the relay 507 from negative battery through the winding of relay 507, back contact and armature 567, front contacts and armatures 573 and 563 and back contact and armature 564 to positive battery. Relay 507 thereupon starts the system into operation for transmission of the supervisory signals to indicate at the office the operation which has been performed at the substation. Four supervisory impulses are transmitted in accordance with the trip operation of the breaker. The manner in which this is accomplished has been described in connection with the check code and need not be described again.

During the transmission of the fourth impulse, the counting chain relay 606 is energized as has already been explained and this in turn completes an energizing circuit again for the relay 644 over the circuit described hereinbefore.

Energization of the relay 644 completes an energizing circuit for the relay 518 from negative battery through the winding of relay 518 over front contact and armature 517*b*, the front contact and armature 571, conductor 505*a*, and front contact and armature 650 to positive battery.

Energization of the relay 518 opens the circuit for the relay 507 at the back contact and armature 504 so that relay 507 is deenergized to terminate further supervisory impulses. After an interval of time relays 505 and 506 are deenergized in a manner described hereinbefore. Deenergization of the relay 507 also restores the counting chain to its original condition which in turn will result in the deenergization of relay 644 to its original condition. In this manner the supervisory impulses transmitted from the substation are terminated. These impulses are rereceived at the office end in the manner described hereinbefore for operating the counting chain thereat in the usual manner.

The locking circuit for the relay 110 over its armature contact to negative battery is thereupon by-passed over front contact and armature 166, conductors 165 and 361, front contact and armature 408*a*, conductor 408*d*, front contact and armature 362 of the counting relay 306, to positive battery.

Relay 110 is thereupon dropped out and its armature 127 dropped to its lower contact, completing a circuit for the green "tripped" lamp 106 and opening the circuit for the red "closed" lamp 102, thus indicating that the breaker has been tripped.

An interval after the deenergization of relay 423, relay 422 deenergizes, and relays 306 and 302 are deenergized and their locking circuits are opened. Upon the deenergization of relay 422 and while relay 408 is still energized, an energizing circuit is completed for the relay 491 from negative battery through the winding of the relay 491, armature 493 and its front contact, armature 408*b* and its front contact, and the back contact and armature 422*b* to positive battery. Relay 491, upon energization, locks itself over an obvious energizing circuit including its armature 491*a* and completes an energizing circuit for the relay 405 from positive battery over armature 491*b* and its front contact and through the winding of the relay 405 to negative battery.

Energization of relay 405 completes an obvious energizing circuit for the relay 430 for the transmission of a restoring impulse to the substation.

As a result of the impulse transmitted over the line in response to the energization of relay 430, relay 429 is energized, opening the circuit of the relay 428. A further result of the energization of the relay 429 is to complete an energizing circuit for the relay 423 which in turn completes energizing circuits for the relay 422 and relay 421. A further result is that counting relay 303 is again energized over a circuit which should now be obvious. All these relays perform no functions at this time. After an interval of time, however, relay 428 will drop out.

It will be noted that, although heretofore relay 429 was not deenergized long enough to permit relay 428 to drop out, in the present instance, the relay 430 is energized continuously over the circuit controlled by relay 405 for a sufficiently long time to permit relay 428 to drop out, which in turn, causes the deenergization of relays 241, 237, 245, 229, 236, 404, 419, 402, 423, 422, 421, 303, 418, 416, 417, 415, 411, 410, 409, 407, 491, 406, 125, 122 and 115. It is to be noted that only the positive symbol surrounded by a double circle signifies a direct connection to positive battery, while all points showing a positive symbol surrounded by a single circle derive their positive battery through armatures and front contacts 435 and 599 of relays 428 and 508 at the office and substations respectively. Relay 420 now energizes over the back contact and armature 435 of relay 428. Deenergization of relay 115 in turn causes the deenergization of relay 314. Deenergization of the relay 491 in turn opens the energizing circuit for the relay 405 which, after an interval of time, permits its armature to drop to the back contact, opening the energizing circuit for the relay 430 and thus terminating the restoring impulse.

An interval after the deenergization of relay 430, relay 429 is deenergized in turn energizing relay 428, and relay 420 is thereupon deenergized. Relay 420 delays starting from the office after release long enough to allow substations to seize the line for indications which may be waiting. The apparatus at the office is now restored to normal in preparation for the transmission of further impulsing.

At the substation, when the restoring impulse is received, resulting in the energization of relay 511 which in turn energizes relay 509, an energizing circuit is completed for the relay 503, over a circuit already described, and an energizing circuit is completed thereby for the relay 502 which in turn completes an energizing circuit for the relay 501 which in turn energizes relay 500.

At the same time, the energization of relay 509 opens the energizing circuit for the relay 508.

As was the case at the office, the impulse is on the line long enough to permit the relay 508 for the first time to drop out. When relay 508 has dropped out, it opens the energizing circuit for relays 515, 514, 503, 502, 501, 500, 603, 522, 521, 520, 525, 524, 523, 517, 518, 700 and 714 which are all deenergized. After an interval of time the impulse terminates, as described heretofore and relay 509 is deenergized, thereupon again completing an energizing circuit for the relay 508 and the apparatus at the substation is again in a normal condition.

In the foregoing paragraphs only the operations which occur when operations are originated at the office have been described. Operations may also be originated at the substation as a result of an automatic operation of a breaker at the substation. In such an event it is desirable to immediately advise the dispatcher of the operation of a breaker by changing the supervisory signalling lamp individual to that particular breaker in accordance with the new condition of the breaker.

In order to explain the operations which occur when operations are originated at the substation since they are very similar to those which occur when operations are originated at the office, a brief résumé will first be given of the operations which occur as a result of the origination at the office as described in detail in the above and this will be followed by a brief analysis of the operations originating at the substation as a comparison.

When operations originate at the office, it will be recalled, that following the selective energization of predetermined ones of the code controlling relays such as the group of relays 241 to 244, relays 404 and 419 were energized, which, in turn, control the energization of relay 427 and relay 428, which, upon energization, in turn, completed the energizing circuit for the impulsing relay 430.

Thereafter, a series of station selecting impulses were transmitted from the office to the substation, the number of such impulses being determined by relay 418 which energized under control of one of the station code controlling relays after the proper number of impulses had been transmitted.

At the substation, relay 522 was energized. Thereupon a station check code was transmitted back from the substation to the office, the sending of this code being under control of the relay 525 which energized after the correct number of impulses had been transmitted.

At the office, a station selection relay such as relay 125, was energized and at the same time relay 411 was energized. Thereupon, the office sent a group selection code which code was stopped by the energization of the relays 416 and 417, the energization of which in turn was controlled by the group code controlling relays, such as relays 237 to 240.

At the substation, in response to the group selecting relays, a group relay such as 700 to 704 was energized and relay 521 was energized.

The substation, thereupon sent a group check code back to the office. The sending of this code was in turn stopped by the relay 524 which was controlled by the particular group selection which had been made at the substation. At the office, in response to the group check code received, a group relay such as 122 was energized and relay 410 was energized.

The office now sent a point code which was controlled and stopped by the relay 415 under control of the point code control relays, such as the group of relays 226 to 235. At the substation, in response to this point selection code, a point selection relay such as 714 or 715 was energized and at the same time a relay 520 was energized.

The substation now sent a point check code back to the office which was stopped by the relay 523 in accordance with the point selection relay which had been energized at the substation. At the office, in response to this point selection check code, a point selection relay such as relay 115 was energized and relay 409 was energized.

With the apparatus in normal non-operating condition, if an automatic operation of a breaker occurs at the substation, the apparatus is started into operation, or originated, at the substation. This occurs in the following manner.

It will be assumed for purposes of illustration that the breaker associated with the auxiliary switch 734 is automatically operated into its tripped position, it being shown, in the present illustration, in its closed position. Thereupon, relay 720 is deenergized by the opening of the auxiliary switch 734. Upon deenergization of the relay 720 the armature 739 moves from its front to its back contact, momentarily opening the energizing and locking circuit for the relay 725. It will be noted that relay 725 is shown locked over its own armature 738. When this circuit is opened by the momentary movement of armature 739 from its front to its back contact, relay 725 is deenergized, its original energizing circuit being open at this time. At this time, it will now be noted that the deenergization of relay 725 occurs regardless of whether relay 720 is energized or deenergized as a result of an automatic or manual closing or tripping, respectively, of the associated breaker. In either case, armature 739 will momentarily open the locking circuit for the relay 725. Upon deenergization of relay 725, armature 738 drops to its back contact completing an energizing circuit for the relay 702.

As a result of the energization of relay 702, an energizing circuit is completed from positive battery over armature 753 and its front contact, conductors 754 and 672, back contact and armature 544 and through the winding of the relay 516 to negative battery. A multiple circuit also extends through the winding of the relay 530 to negative battery. Relays 530 and 516 are thus energized, and relay 516 in turn locks itself over its armature 546 and the back contact and armature 569 to positive battery. An energizing circuit is thereupon completed for the relay 507 from negative battery through the winding of the relay 507, the back contact and armature 567, front contact and armature 516a back contact and armature 529a to positive battery.

The manner of impulsing from the substation to the office and the transmission of supervisory signals are from this point on exactly the same as described above, except for the following:

The first impulses transmitted from the substation are the station selecting codes for indicating the particular station from which the supervisory signals are being received. These impulses are stopped after the correct number of impulses have been transmitted by energization of the relay 529, the circuit for which is completed over the front contact and armature 530a, conductors 598, 673 and 755 and the counting chain relay 604 for this particular station.

At the office, in response to these impulses, a station selecting relay, such as 125, is energized.

At the same time, relay 411 is energized and the office sends back to the substation a station check code indicating the selection made at the office in response to the code transmitted from the substation.

This code when received at the substation automatically permits transmission of a second code for indicating the group selection in accordance with the group in which the particular breaker, which is automatically operated, is located.

This check code, transmitted from the office to the substation, is stopped by energization of the relay 414 when the proper counting chain relay has been energized and this circuit is controlled over the counting relay chain and the particular station selecting relay which has been energized previously by the code received from the substation.

At the substation in response to this check code, the relay 522 is energized and the substation now sends a group selection code. This group selection code is in turn stopped by energization of the relays 527 and 528 which are energized over the counting chain and the particular group control relay such as 702 of the group in which the automatically operated breaker is located. At the office, in response to the group selection code received, a group selecting relay such as 122 and relay 410 are energized.

Energization of relay 410 permits the transmission from the office of a group check code which is in turn stopped by the energization of the relay 413 controlled over the counting chain and the particular group selecting relay such as 122 which is energized by the received code.

At the substation, in response to the group checking code received there, a group selection relay such as 780 is energized and relay 521 is energized. The substation now sends a point selection code, the number of impulses for which is determined and controlled by the relay 526 which stops the transmission of such impulses upon energization.

At the office, in response to a point selection code, a point selection relay such as 115, is energized and the relay 409 now energizes to transmit the point selection checking code. The impulses in the point selection code are stopped by the relay 412 which is energized over a circuit including the counting chain and the particular point selecting relay which has been energized by the previous code.

At the substation, in response to the point selection checking code, a point selection relay, such as 714, energizes and the relay 520 energizes.

The substation now sends a supervisory code in accordance with the particular breaker which has been operated, in a manner described in connection with the previous description of operation initiated at the office.

At the office, in response to the supervisory code, a relay, such as relay 110 is operated, which in turn controls the supervisory lamp to indicate the remote circuit breaker operation.

It should be noted, that when the substation sends a supervisory signal to record an automatic operation, relay 253 is energized over a circuit from negative battery through the winding of relay 253 and over front contact and armatures of relays 412 and 408 which had previously energized to positive battery. The alarm lamp 203 is illuminated over a circuit including the armature 268 of relay 253 and the alarm bell 204 is also operated over a circuit controlled by relay 253, thus advising the dispatcher that a supervisory signal has been received.

It may happen that the equipment jams at any selecting position due to line troubles or other reasons. In such cases, it is desirable to reset the apparatus in order that a second opportunity for operation may be provided.

This is accomplished by pressing the release or reset key 208. Operation of the reset key 208 to move its spring to engage its upper contacts will complete an energizing circuit for the relay 491 from positive battery over the contacts of key 208, front contact and armature 493 of relay 490 which is energized at this time, and through the winding of the relay 491 to negative battery. Relay 491 closes a locking circuit for itself at its upper armature.

Energization of relay 491 also completes an obvious energizing circuit for the relay 405 over armature 491*b* which in turn at armature 444, completes an energizing circuit for the relay 430 to send an impulse over the trunk conductors. As a result thereof, line relays 429 and 509 will be energized.

Energization of line relays 429 and 509 opens the energizing circuits for the slow releasing relays 428 and 508 respectively. After an interval of time, these relays deenergize, opening the master positive and deenergizing all the relays which may at that time be operated from this positive.

At the office, relay 317 deenergizes, when the key 208 is released, in turn deenergizing relay 405 and relays 429 and 509 will again deenergize. All the apparatus is now back to normal rest position again in preparation for further operation.

In the event that the checking impulses in the case of a control operation initiated by the dispatcher do not agree with the individual unit to be operated by the dispatcher, provision is made in accordance with my invention for automatically restoring the apparatus to normal in order that the selecting operation may be repeated and to visually indicate to the dispatcher that the checking code does not agree with the intended selection.

To illustrate this, it will be assumed that the checking code does not agree with the selection desired, therefore does not operate the point selection relay 115 but instead, for example, operates relay 116 or for that matter, any other of the point selecting relays.

It will be recalled that when checking impulses were received at the office, relay 400 was energized in parallel with relay 421 and that this relay was released by relay 491 operating in parallel with relays 125, 122 or 115 depending upon whether the station, group or point selection was being checked.

In the event, however, that the energizing circuit for this point selection relay 115 is not closed, because of the fact that the checking code does not agree with the key operation, then the above circuit for relay 401 is not completed since a counting chain relay other than the correct one is at this time energized.

If, therefore, the dispatcher fails to note, by observing the checking lamp 101, that the checking code does not agree with the individual key operation and proceeds to depress the master control key 211, the operation of the control code will be transmitted but will not stop at the end of the proper impulse, in view of the fact that relay 400 is still energized maintaining a circuit for relay 427 over back contact and armature 441, front contact and armature 442, armature and front contact 443, front contact and armature 406*b*, back contact and armature 406*b*, back contact and armatures 466 and 423*a* to positive battery. Accordingly, sufficient impulses will be transmitted to energize all of the relays in the counting chain 303 to 313 at the office and 603 to 613 at the substation.

When the last one of these relays 313 is energized, and a further impulse is transmitted, the release relay 491 is energized in lieu of a further counting relay which operates to restore the apparatus to normal in the manner which has already been described in detail hereinbefore.

In the event that the checking code combination from office to substation which follows the initiation of operations by an automatic operation of a breaker, indicates that the selection made at the office does not agree with the breaker which has operated at the substation, an automatic release of the apparatus to normal condition is also obtained by means of relays 512 and 513, corresponding to relays 400 and 401, and the apparatus is again initiated into operation for indicating such supervisory operation.

It will be recalled that in the supervisory operations described hereinbefore in connection with the automatic operations of relay 725 associated with a breaker, that relay 714 was energized in response to the checking code received from the office to indicate the supervisory selection made thereat. If, however, any other point selecting relay than 714 is energized, indicating that a different supervisory selection was made at the office than that of the operated breaker, the circuit for relay 507 traced hereinbefore, which upon energization, controls the sending of the supervisory code combination of impulse conditions is not opened due to relay 512 not being previously released by the energization of relay 513.

Accordingly, when the supervisory code combination of impulses is transmitted, the impulses are not stopped at either the third or fifth impulse as in the case of tripping or closing, respectively, but will continue until all of the relays of the chain 600 to 613 at the substation and 304 and 313 at the office are energized.

When the last of these relays are energized and a further impulse is received at the office, an energizing circuit is completed for the relay 491. Relay 491 is energized and restores the apparatus to normal.

However, relay 725 is still deenergized and the apparatus is again started into operation in the manner described hereinbefore and a supervisory point selecting code combination of impulses is transmitted from the substation to the office and again a checking code is received at the substation. If this checking code agrees with the circuit breaker operation, normal operations as described hereinbefore will occur.

The battery at the office may momentarily be lost. This may occur during a number of conditions, as for example, when the apparatus is in operation for remotely controlling a circuit breaker or for sending supervisory signals, or it may happen, while the apparatus is in its normal position of rest. In the former case, it is necessary to avoid either a wrong selection or an inaccurate supervisory signal. In the latter case, the relays at the office which may be energized, as for example, the individual relay 110 or 111 and which, when energized, indicate the closed position of the circuit breakers, would lose their energizing circuit and, accordingly, indicate a false position of the remote individual breakers.

To correct this, I provide in my system automatic means for instantaneously restoring the apparatus to normal when the office battery is lost.

It will be assumed that battery is momentarily lost at the office. It will be recalled that relay 490 was described as energized when the apparatus was first put into operation and locked at its armature 492. Relay 490 thereafter remained energized during all conditions except when the the battery is momentarily lost, in which event relay 490 at once deenergizes. Upon deenergization of relay 490 in response to a momentary loss of battery, a circuit is prepared for relay 491 at armature 493. As soon as the battery returns, relay 491 is energized, and at its armature 491*b*, completes an energizing circuit for the relay 405. Relay 405 energizes and at its armature 405*a* completes an energizing circuit for the relay 490 which thereupon locks itself again at its armature 492. Relay 405 also completes an energizing circuit for the relay 430 which in turn closes the line circuit for the relays 429 and 509.

Energization of the relay 429 deenergizes relay 428 which, after an interval of time, drops its armatures to disengage their front contacts, thus restoring the apparatus to normal, as described hereinbefore.

Similar operations are performed at the substation to restore the apparatus thereat to normal.

When the battery is lost momentarily at the substation, all of the relays, such as 725 and 726, individual to circuit breakers or other apparatus units, are deenergized and accordingly, when the battery is again restored these relays will control the intermittent energization of the relays 516 and 530 at the end of each cycle of supervisory operations to transmit to the office, supervisory signals indicating the position of all of the breakers.

It will be noted, that no finder switches either at the dispatching office or substations are provided in my system. I have provided, as part of my invention, simplified means which eliminate the need of any finder switches and which enable storing of indications in the case of automatic operation of a number of breakers at the substation simultaneously or during the period while a supervisory code is being transmitted or in the event of an automatic operation of a breaker during the period while the dispatcher is transmitting an operation.

It will be assumed that during the period while the dispatcher is transmitting an operation and the selecting apparatus is in operation, a circuit breaker automatically operates from one position to another.

When the circuit breaker operates, relay 725 is deenergized, as described hereinbefore. Thereupon, an energizing circuit is prepared for the relay 702 which in turn energizes relays 516 and 530 to control starting of the supervisory signals. These latter relays, however, are not energized if the system is at this time in operation, since relay 514 in that event is energized. When, however, the apparatus has restored to normal, the signal stored in deenergized relay 725 will start supervisory signals in the manner already described.

If more than one breaker operation occurs during operations and, say, relays 725 and 726 are deenergized, supervisory operations will be repeated until all such deenergized relays 725 and 726 have been restored to normal.

In the event that the battery at the office, through some fault in the system is interrupted rapidly, it would tend to transmit impulses which simulate the regular code combination of impulses. In order to prevent this, the relay 430 is made a slow deenergized relay. When the relays 491 and 405 are energized as described hereinbefore, following the return of the lost battery, a circuit is completed for the relay 430 and subsequently relay 430 is deenergized, following the deenergization of relay 405. If, however, the battery comes on and off very rapidly, relay 405, being a slow relay, will be too slow to follow the rapid battery operation, and therefore, will maintain the energizing circuit for the relay 430. Relay 430 will, accordingly, remain energized since it is also a slow relay and cannot follow the rapid pulsating of the battery current. Accordingly, these rapid impulses will not be transmitted over the line.

In the event that the false impulses simulating the signalling impulses are caused by the intermittent opening and closing of the line itself, then the apparatus at the dispatcher's office and at the substation both operate as receiving apparatus.

Following the receipt of these impulses, the apparatus at the dispatcher's office will function as a transmitter and at the same time, the apparatus at the substation will function as a transmitter. Accordingly, no checking of the selection will be obtained at either station and no individual point relays are energized.

The alarm lamps 140 and 141 at the dispatcher's office will warn the dispatcher of an incorrect operation and he will then operate his release key to restore the apparatus to normal.

In the event that the signalling line is seized by the dispatcher for transmitting control operations and the signalling line is simultaneously seized by the supervisory apparatus at the substation in response to an automatic operation thereat for transmitting supervisory signals, then impulses will be transmitted from the control office to the substation and from the substation to the control office simultaneously. At the control office, these impulses are transmitted by a relay 430 in the manner already described, and at the substation, these impulses are transmitted by the relay 510. Inasmuch, however, as the impulsing is, in turn, also controlled by the line relays 426 and 509 holding relays 425 and 505, the time interval of the impulses is maintained uniform and is not mutilated by reason of the fact that they are being transmitted from both ends of the line simultaneously.

If the number of impulses transmitted from the substation is greater than the number transmitted from the office, then in response to the impulse received from the substation after the office has completed its transmission, the relay 427 will be deenergized. At this time, slow relay 426 is still energized, but the apparatus at the dispatcher's office is not expecting any signals, inasmuch as it has just been acting as a transmitter and a time delay is provided between the last impulse transmitted from the dispatcher's office and the first check impulse which is to be received from the substation. During this period, the slow relay 426 normally drops out, and its armature 462 moves to engage a back contact.

In the present assumed condition, however, an impulse is received at the dispatcher's office almost immediately after the transmission of the last control impulse and during a period while the relay 426 is still up. Accordingly, in response to the receipt of this abnormal impulse, an energizing circuit is completed for the relay 424 from negative battery through the winding of the relay 424, front contact and armature 462, back contact and armature 455, front contact and armature 452 and front contact and armature 434 to positive battery. Relay 424 is energized and locks itself over its own armature contact, and the armature 453 opens the impulsing circuit for the counting chain. Accordingly, the counting chain is blocked from further operation, and when the dispatcher notes that he is not getting a signal from his point lamp, he will operate his reset key, restoring the selecting apparatus to normal.

In the event that the number of impulses transmitted from the office is greater than the number of impulses transmitted from the substation, then following the transmission of the last impulse from the substation, the next impulse received from the office will energize the relay 504 over a circuit including the front contact and armature 536. As in the case of the office, following the transmission of the signals from the substation, a time interval is provided between the transmission of the last impulse from the substation and the first impulse to be received from the office, which is long enough to normally permit the relay 506 to drop out and move its armature 536 to engage its back contact. Since, however, in the case assumed, the next impulse is received immediately after the last impulse transmitted from the substation, relay 506 does not get sufficient time to drop out and as a result, relay 504 is energized as described above. As a result of the energization of relay 504, armature 541 disengages the back contact, opening the impulsing circuit to the counting chain relays and preventing further operation of these relays.

In this case, also, the dispatcher, by observing that no indication is received on his check lamp will be advised of trouble on his system and will operate his reset key to restore his apparatus to normal.

In the event that both the office and substation transmit exactly the same number of impulses, when they seize the line simultaneously, following the complete transmission of these impulses, the apparatus at both stations will switch over for receiving signals. Inasmuch, however, as neither station is acting as a transmitter at this time, neither station will receive any signals and, accordingly, the dispatcher will again, after an interval of time, observe that nothing is happening to complete the operations and will operate his reset key.

In all supervisory control systems, it is essential in view of the fact that the remote circuit breakers are not visible to the dispatcher, that means be provided for preventing the dispatcher from persisting in attempting to close a breaker against a short-circuit as this results in damage both to the breaker itself and to the short circuited system.

This is accomplished in the present case by the immediate energization of relay 517 which energizes when the breaker changes its condition for the first time and prevents the dispatcher from again seizing the line once he has completed the transmission of the first closing operation by seizing the line first for the transmission of the line for sending supervisory signals.

I have illustrated, in Fig. 8, an extension of the trunk conductor, 432 and 433 and 436 and 437 to a second substation. The first substation, it will be shown later, is provided with relays 582, 583, 584, 585, 586, 587, 588, 589 and 591 for switching the apparatus from one pair of trunk conductors 432 and 433 to the other pair 436 and 437. The second substation is similarly provided with switching relays 806 to 808 and 812 to 817.

Relay 810 is the impulsing relay similar to the relay 510 at the first substation and controls at its armatures 842 and 843 the transmission of signals over the trunk conductors. Relay 811 is the line relay connected across the conductors in a manner similar to the relay 511 at the first substation and operates in response to impulses transmitted over the trunk conductors.

The relay 809 is similar to the relay 509 at the first substation and is operated under control of the line relay 811 to in turn control the apparatus at the second substation over its armatures 833 in the manner described in connection with the first substation.

The particular station, that is, whether the substation number one or substation number two is to be selected for operation in response to operations originating at the office, is determined by the first or station selecting code which has been transmitted. It will be recalled that in the discussion above it was pointed out that in the illustration shown, the armature 783 at the first substation was shown connected to the conductor extending to the relay 522.

Inasmuch as the armature 783 is connected to the armature of the second counting relay 604, this results in effect that in the event that the first code for making a station selection comprises two impulses, one which is the common impulse for all impulsing and a further single impulse which is a station selecting impulse, then the relay 522 at the first substation is energized. During the transmission of the first impulses relay 787 is energized.

In all of the other substations the associated armature 783 is not jumpered to the associated relay 522 thereat. Instead, a different armature such as 792 or 793 is jumpered to the relay 522 at each of the substations so that different impulses transmitted in the first code will determine at which particular substation relay 522 is to be operated, since each of the armatures such as 783, 792 and 793 is connected with a different one of the counting chain relays. Thus, as shown, two impulses complete the circuit of armature 783 at the first substation to the relay 522. Three impulses, on the other hand, would cause the energization of the third counting relay and therefore complete a circuit at a different substation to an associated relay 522, and so on.

On the other hand, all other armatures of relay 787, except the particular armature which is connected to relay 522 are tied to each other and connected to the relay 504. Thus, at the first substation, it will be noted that all of the armatures of the relay 787 other than armature 783 are tied together and then extend to the relay 504. Accordingly, on receipt of any number of impulses for the first code other than two impulses, the relay 504 will be energized. A similar connection is made at each of the other substations.

The circuit for the relay 504 extends from negative battery through the winding of the relay 504, conductor 504*b*, and in multiple to the armatures of relay 787 and thence over the counting relays 604 to 613 depending upon which one of these is energized, over armature 568 to positive battery. Upon the energization of the relay 504 a locking circuit for this relay is provided over its own armature 569. At armature 541, the energizing circuit extending to the counting chain is opened thus preventing further energization of the counting chain by further code impulses received at this particular station. At its armature 504*a* it prevents any accidental reenergization of the group of relays individual to the unit, such as relays 725, 726 and so forth, in the event that such a relay is dropped off by an automatic operation of the breaker. It will be recalled that when such a relay is dropped off this will prepare the selecting apparatus at this station for transmitting signals to the office. If, however, at this time, the selecting apparatus is already in operation, the relay will remain deenergized until the apparatus is restored to normal, upon which it will restart the apparatus into operation.

In the event that more than two substations start to operate simultaneously due to an automatic operation in each of these stations occurring at the same moment, the station having the smaller number of station selecting impulses will, immediately after it has transmitted this number of impulses, have its relay 506 still energized when further impulses are received from the other stations. Thereupon the circuit is completed for the lockout relay 504 as described hereinafter.

It will be recalled in this connection that when a substation starts into operation, the relays 516 and 530 at all sending substations are energized and that an energizing circuit over the armatures of these relays is provided for the relay 507. This circuit includes the armature 529*a* and the back contact of relay 529.

The relay 507 thereafter remains energized over this circuit.

When, however, at the end of the impulsing for the substation, having the smaller number of impulses, relay 529 energizes for the purpose of stopping the transmission of further impulses in a manner which has already been described in detail, the energizing circuit for the relay 507 is opened and this relay thereupon drops out. Accordingly, when the relay 509 energizes in response to the next impulse coming from the other substations having a larger number of impulses for the station selection, relay 507 is deenergized.

At this time, however, slow relay 506 has not yet had an opportunity to deenergize. Accordingly, a circuit is completed from positive battery over armature 533 and its front contact, armature 534 and its front contact, armature 535 and its back contact, armature 536 and its front contact, and through the winding of the relay 504 to negative battery. Relay 504 thereupon energizes and locks out the station with the smaller number of impulses.

The counting relays at this station are, therefore, not responsive to further impulsing and after a while will be restored to normal in a manner which has already been described while the station with the larger number of impulses will continue to operate to transmit the supervisory signals. Thereafter the station with the smaller number of impulses will again seize the line and start to transmit the signals indicating its operation.

In the event that the office and one or several substations commence transmission at the same time, that station which is transmitting the highest number of impulses will seize the line and continue its operations while all other stations, including the office, are locked out in the same manner as though two or more substations were sending at the same time, as described in the above.

When the dispatcher's office, however, is one of the stations which is transmitting simultaneously, the operation is somewhat different. In the event that two or more substations are transmitting at the same time, they invariably have different station codes so that all but one station will be locked out. If, however, the office and several substations are sending at the same time, the office may attempt to select one of the stations which is transmitting. In that case the number of impulses sent by the office and by one of the substations will be the same.

As long as the office is trying to select any one of the substations except the one with the highest code that is transmitting, the office will be locked out in a manner described above.

If, however, the office is attempting to select that substation of the several which are transmitting, which has the highest station code, the office will not be locked out. In this event both the office and substation will transmit exactly the same number of impulses. When they seize the line simultaneously following the complete transmission of these impulses the apparatus at both stations will switch over for receiving signals. Inasmuch, however, as neither station is acting as a transmitter at this time, neither station will receive any signals and accordingly, the dispatcher will again, after an interval, observe that nothing is happening to complete the operations and will operate his reset key.

When the office battery is interrupted momentarily, the single station, supervisory system is arranged to automatically check the position of all the breakers at the substation. In a multi-station system with a large number of stations and a large number of breakers in each station, this check would ordinarily require considerable time and would prevent the operator from performing the operation which may be vitally important. The multi-station set, therefore, is arranged to perform the checking of the substation under the control of the dispatcher. A master check key is provided for each station and upon the depression of this master check key all breakers at this particular station will be checked. In this manner, it is possible for the operator to perform an operation at a substation after checking only the station where he wishes to perform the operation and postpone the check of the balance of the substations until he has performed the vitally important operation.

The master check key is identical in its functions to an ordinary point selection relay. In other words, it energizes one of the station selection relays 241 to 244, one of the group selecting relays 237 to 240, and one of the point selecting relays 226 to 235.

Similarly, a predetermined selection point at the substation is utilized to perform the master check operation. Instead of operating one of the regular point selection relays such as relay 704, the master check circuit will operate a relay 784. Then, when the operation control code is transmitted instead of operating the trip or close magnet of one of the breakers, relay 785 is operated which opens the negative battery supply to all of the relays such as 725 and 726 causing them to release and thereby to send supervisory signals.

At the office end, instead of energizing one of the regular point selecting relays such as relay 115, the master check point directly operates relay 442 which in turn extends this operating circuit to relays 407 and 409 which furnishes a locking circuit for the relays 442, 407 and 409. In this manner the master check function is performed without depression of the master control key, as will be clear from the following.

If it is desired to check the point before operating it, the dispatcher will depress the operating key in the normal manner and wait for the selection lamp to illuminate. Then, instead of depressing the master control key, he will depress the check key 214 which will energize relay 442 and extend this operating circuit to relay 407 which is the relay controlled by the master control key. In other words, relays 442 and 407 are energized by the check key while only relay 407 is energized by the master control key. Relay 442 completes the circuit over armature contact 363 of relay 304 to stop the sending of the operation control code after the second impulse, and only two impulses are transmitted to the substation. At the substations, the functions are similar to that described heretofore and following the receipt of the two impulses, the supervisory signal will be transmitted without effecting on operation of the breaker. In this case, relay 517 is energized over conductor 519b and armature 675 of relay 604.

In supervisory control systems where operation must be maintained continuously irrespective of cost, it is sometimes desirable to have a spare set of line trunk conductors preferably using a different route so that the system can be switched to the spare set of trunk conductors in case of trouble on the regular trunk. To switch this system to the alternate trunk conductors, the line key 223 is depressed which applies positive and negative battery across the alternate trunk conductors of the line 2, thereby energizing relay 484. Relay 484 will operate the magnet 495 which is of the mechanical latching type, thereby tripping its armatures and preparing a circuit for the relays 497 and 499. While relay 484 is energized, however, this circuit is kept open at the break contact of armature 484a of relay 484 and the circuit for relays 487 and 498 is maintained over make contact of armature 484a of relay 484. When the line key is released, relay 484 is deenergized, thereby deenergizing relays 487 and 498 and energizing relays 497 and 499. This switches the system to trunk conductors 436 and 437. Similarly, the set can be switched back to conductors 432 and 433 by depressing the line key 218. Practically the identical operation takes place at the substation. The line over which the system is operating is indicated by line pilot lamp 217 or 221.

In Fig. 9 I have illustrated my invention as applied to a system in which the trunk conductors are connected in parallel to the line relays at the dispatcher's office and at each of the substations, and in Fig. 10 I have illustrated my invention as applied to a system in which the trunk conductors are connected in series with the line relays at the dispatcher's office and each of the substations.

It will be noted that, although signalling operations may originate from any one of a plurality of stations which are connected to the same trunk conductors and these impulses may be independently transmitted from each of these substations, no confusion of signalling can occur in my system. Assuming for example that signals have originated at the office and the relay 910 thereat is at the moment energized for transmitting a single impulse over the line, and during this period impulsing at the same time originates, for example, at the second substation shown and that relay 916 also energizes to transmit impulses to the line. It will be assumed, further, that the relay 910 at the office end deenergizes due to the fact that the first impulse has completed its necessary cycle, resulting in the deenergization of relay 910. One result thereof ordinarily would be the deenergization of its own line relay 911 and subsequently of its relay 909 which in turn, after an interval as explained hereinbefore, would result in the reenergization of relay 910. Under the assumption, however, that relay 916 at the second substation is still energized, the impulse signal still remains on the trunk conductor, thus maintaining the relay 911 at the dispatcher's office energized and therefore relay 909 energized preventing the reenergization of relay 910. In fact, relay 910 at the office cannot again energize until the impulse on the line is terminated by the deenergization of relay 916, at the last substation. Thus, if one or more substations are transmitting simultaneously no confusion can occur. The rate of impulsing will be determined solely by the slowest operating transmitter in the system.

Thus, for example, when the transmitter relay 916 at the last station finally opens the line, the relay 915 thereat and the relay 911 at the office will both deenergize and as a result thereof deenergizing relays 909 and 917 which in turn will ultimately cause reenergization of relays 910 and 916, respectively.

Accordingly, it is immaterial which of the relays, 910 at the office or relay 916 at the substation, energize or deenergize first. In either event, their associated relays 911 and 915 will energize in unison, in turn energizing their associated relays 909 and 917 for the operation of the next impulse.

In the system illustrated in Fig. 10, the reverse operations occur but in exactly the same manner and with the same effect as described above. Normally the line circuit is closed and the impulsing is accomplished by the opening of the line by energization of relays 1010, 1013 and 1016 in any one of these various substations.

As in the case of Fig. 9, if an impulse originates at the office by energization of relay 1010 and about the same time an impulse is transmitted from the substation by energization of, for example, relay 1013, the line will be held open until both of these relays are again deenergized. Thus, the impulse will be maintained until the cycles of operation have been completed at both stations, and only when both relays 1010 and 1013 have deenergized will the impulse be terminated. Termination of the impulse in turn will permit a reenergization of these relays for the transmission of a second impulse.

In the parallel line system, illustrated in Figs. 1 to 9, by reason of the circuit connections of the signalling conductors between the dispatcher's office and substation, any surge voltage induced therein from adjacent power lines will be induced equally in each of the signalling conductors, so that both conductors will be at the same potential with respect to ground and at equal potential with respect to each other. Accordingly, such signals will not affect the receiving relays which are across the line. Such induced voltages, however, do have a potential with respect to ground and to prevent a dangerous potential rise, draining resistances such as 432*a*, 433*a*, 436*a*, 437*a* and shown in more detail at 850 to 855 are connected between the trunk conductors and ground, providing a path for the discharge of the induced surges. Or, in the event that the surge is sufficiently large to break down the discharge tubes such as shown at 856 and 857, the discharge will flow through this tube to ground. The signalling current, on the other hand, inasmuch as it does not find a return circuit to ground, will pass over the conductors and through the receiving relays in a manner which has already been described, the effect of the draining resistances being merely that of a shunt.

Although in the circuits described above, a specific illustration of one manner of carrying out my invention is described, it will be obvious that there are other systems in which my invention may be applied.

Although my invention is described in connection with supervisory control, it will be obvious that it has adaptations to other forms of signalling systems, and I do not intend to limit myself to the specific system herein used for illustration, except insofar as set forth in the appended claims.

I claim as my invention:

1. In a supervisory control system, a dispatcher's office, a plurality of substations, a counting chain at said office and at each of said substations, said counting chains being normally in a receiving condition, apparatus units at said substation, a single signalling channel extending from said office to each of said substations, means at the office and the stations for switching the chains to a transmitting condition, means including said single signalling channel for operating said counting chain at said office and each of said substations in synchronism, means including said counting chains, the switching means at the office, and said single signalling channel for selecting one of said stations for operation, means including the counting chains at said selected station and said dispatcher's office and the switching means at the selected station for indicating, at said dispatcher's office, the station selected, means including said counting chains at the office and selected station and the switching means at the office and said single signalling circuit for selecting one of said apparatus units for operation, means including said counting chains at said selected station and at dispatcher's office and the switching means at the selected station for indicating said selection at said dispatcher's office, means including said counting chains at said station and said dispatcher's office, the switching means at the office and said single signalling circuit for operating said selected apparatus unit, means including said counting chains at said office and selected substation, the switching means at the selected station and said signalling circuit for indicating the operation performed by said selected unit, and means operated in the event that the indication of the selection of station and remote unit selected does not agree with the selecting operations performed from the office for preventing operation of the incorrectly selected unit.

2. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel and to their associated direct current sources, a receiving relay winding individual to each station connected across the signalling channel, and a chain of relays at each station for selectively operating their associated relay in accordance with a predetermined code combination of impulses to be transmitted over said single signalling channel, means at the central station including the transmitting and receiving relays, the direct current source thereat for transmitting codes, said receiving relay at each substation being responsive to said signals for selectively operating their respective relay chains, said relay chains being responsive to said received code for rendering all but a predetermined substation non-responsive to any further codes; means at said selected substation including the direct-current source thereat for switching the relay chain thereat into a condition for controlling the operation of the transmitting relay thereat for transmitting code combinations of impulses; and means at the central station operative following the transmission of said code for rendering the relay chain thereat operative to receive code impulses.

3. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at said central station including the transmitting relay, relay chain and direct current source for transmitting code signals over the single signalling channel, said receiving relay at each substation being responsive to said signals for selectively operating their respective relay chains, said relay chains being responsive to said received code for rendering all but a predetermined substation non-responsive to any further codes; means at said selected substation for switching the relay chain thereat into a condition for transmitting code combinations of impulses; means at the central station operative following the transmission of a substation selecting code for rendering the relay chain thereat operative to receive code impulses; and switching means controlled by said relay chain and including the direct current source at the selected substation for operating the transmitter relay thereat to transmit a code to the central station to identify the selected substation.

4. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at the central station including the transmitting relay, relay chain and direct current source for transmitting code signals over the single signalling channel, said receiving relay at each substation being responsive to said signals for selectively operating their respective relay chains, said relay chains being responsive to said received code for rendering all but a predetermined substation non-responsive to any further codes; means at said selected substation for switching the relay chain thereat into a condition for transmitting code combinations of impulses; means at the central station operative following the transmission of said substation selecting code for rendering the relay chain thereat operative to receive code impulses; switching means controlled by said relay chain and including the direct current source at the selected substation for operating the transmitter relay thereat to transmit a code to the central station to identify the selected substation; means operative following the check of the selected substation if it agrees with the selection set up at the central station for conditioning the relay chain thereat to transmit selecting code combinations of impulses; and means at the substation operative following the transmission of the checking code for conditioning the relay chain thereat to receive selecting code combinations of impulses.

5. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at the central station including the transmitting relay, relay chain and direct current source for transmitting code signals over the single signalling channel, said receiving relay at each substation being responsive to said signals for selectively operating their respective relay chains, said relay chains being responsive to said received code for rendering all but a predetermined substation non-responsive to any further codes; means at said selected substation for switching the relay chain thereat into a condition for transmitting code combinations of impulses; means at the central station operative following the transmission of said substation selecting code for rendering the relay chain thereat operative to receive code impulses; switching means controlled by said relay chain and including the direct current source at the selected substation for operating the transmitting relay thereat to transmit a code to the central office to identify the selected substation; means operative following the check of the selected substation if it agrees with the selection set up at the central station for conditioning the relay chain thereat to transmit selecting code combinations of impulses; means at the substation operative following the transmission of the checking code for conditioning the relay chain thereat to receive selecting code combinations of impulses; means at said office including said relay chain thereat for operating the transmitter relay to transmit a code combination of impulse conditions over said single channel to select one of said apparatus units at said substation for operating, said receiving relay at said selected substation being responsive to said received code for selectively operating said relay chain thereat; and means controlled by said relay chain at said selected substation in response to said received code for selecting one of said apparatus units for operation.

6. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at the central station including the transmitting relay, relay chain and direct-current source for transmitting code signals over the single signalling channel, said receiving relay at each substation being responsive to said signals for selectively operating their respective relay chains, said relay chains being responsive to said received code for rendering all but a predetermined substation non-responsive to any further codes; means at said selected substation for switching the relay chain thereat into a condition for transmitting code combinations of impulses; means at the central station operative following the transmission of said substation selecting code for rendering the relay chain thereat operative to receive code impulses; switching means controlled by said relay chain and including the direct current source at the selected substation for operating the transmitter relay thereat to transmit a code to the central office to identify the selected substation; means operative following the check of the selected substation if it agrees with the selection set up at the central station for conditioning the relay chain thereat to transmit selecting code combinations of impulses; means at the substation operative following the transmission of the checking code for conditioning the relay chain thereat to receive selecting code combinations of impulses; means at said office including said relay chain thereat for operating the transmitting relay to transmit a code combination of impulse conditions over said single channel to select one of said apparatus units at said substation for operating, said receiving relay at said selected substation being responsive to said received code for selectively operating said relay chain thereat; means controlled by said relay chain at said selected substation in response to said received code for selecting one of said apparatus units for operation; said switching means at said office and said substations being operative following said selection of said apparatus unit for switching their receiving relay chains for the transmission from the substation and reception at the office of a checking selecting code; said relay chain at said substation being thereupon responsive to the selection to selectively operate the transmitting contacts thereat to transmit a checking code over said line, said receiving relay at said office being responsive to said received checking code to selectively operate said relay chain thereat; and said office switching means operative in the event that said selection checking code corresponds to the selection code transmitted for conditioning the relay chain at the office to transmit an operation control code; and said switching means at the substation being operative following the transmission of said selection checking code for conditioning the relay chain thereat to receive code signals from said office.

7. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at the central station including the transmitting relay, relay chain and direct current source for transmitting code signals over the single signalling channel, said receiving relay at each substation being responsive to said signals for selectively operating their respective relay chains, said relay chains being responsive to said received code for rendering all but a predetermined substation non-responsive to any further codes; means at said selected substation for switching the relay chain thereat into a condition for transmitting code combinations of impulses; means at the central station operative following the transmission of said substation selecting code for rendering the relay chain thereat operative to receive code impulses; switching means controlled by said relay chain and including the direct current source at the selected substation for operating the transmitter relay thereat to transmit a code to the central office to identify the selected substation; means operative following the check of the selected substation if it agrees with the selection set up at the central station for conditioning the relay chain thereat to transmit selecting code combinations of impulses; means at the substation operative following the transmission of the checking code for conditioning the relay chain thereat to receive selecting code combinations of impulses; means at said office including said relay chain thereat for operating the transmitter relay to transmit a code combination of impulse conditions over said single channel to select one of said apparatus units at said substation for operating said receiving relay at said selected substation being responsive to said received code for selectively operating said relay chain thereat; means controlled by said relay chain at said selected substation in response to said received code for selecting one of said apparatus units for operation; said switching means at said office and said substations being operative following said selection of said apparatus unit for switching their receiving relay chains for the transmission from the selected substation and reception at the office of a checking selecting code; said relay chain at said substation being thereupon responsive to the selection to selectively operate the transmitting contacts thereat to transmit a checking code over said line, said receiving relay at said office being responsive to said received checking code to selectively operate said relay chain thereat; and said office switching means operative in the event that said selection checking code corresponds to the selection code transmitted for conditioning the relay chain at the office to transmit an operation control code; said switching means at the substation being operative following the transmission of said selection checking code for conditioning the relay chain thereat to receive code signals from said office; said relay chain at said office being operative thereupon to selectively operate said transmitting contacts for transmitting a control code over said single signalling channel, said receiving relay at said substation being responsive to said received control code to selectively operate said relay chain thereat; and means controlled by said relay chain in response to said control code for operating said selected unit.

8. In a supervisory control system, a central station, a plurality of substations, a source of direct current at each of said stations, apparatus units at said substations, a single signalling channel extending from said central station to each of said substations, a transmitting relay individual to each of said stations having transmitting contacts connected across the signalling channel, a receiving relay winding individual to each station connected across the signalling channel, and a chain of relays at each station for selectively operating their associated relay in accordance with a predetermined code combination of impulses to be transmitted over said single signalling channel, means at the central station including the transmitting relay, relay chain and direct current source for transmitting code signals over the single signalling channel, said receiving relay at each substation being responsive to said signals for selectively operating their respective relay chains, said relay chains being responsive to said received substation selecting code for rendering all but a predetermined substation non-responsive to any further codes; means at said selected substation for switching the relay chain thereat into a condition for transmitting code combinations of impulses; means at the central station operative following the transmission of said substation selecting code for rendering the relay chain thereat operative to receive code impulses; switching means controlled by said relay chain and including the direct current source at the selected substation for operating the transmitter relay thereat to transmit a code to the central station to identify the selected substation; means operative following the check of the selected substation if it agrees with the selection set up at the central station for conditioning the relay chain thereat to transmit selecting code combinations of impulses; means at the substation operative following the transmission of the checking code for conditioning the relay chain thereat to receive selecting code combinations of impulses; means at said office including said relay chain thereat for operating the transmitter relay to transmit a code combination of impulse conditions over said single channel to select one of said apparatus units at said substation for operating, said receiving relay at said selected substation being responsive to said received code for selectively operating said relay chain thereat; means controlled by said relay chain at said selected substation in response to said received code for selecting one of said apparatus units for operation; said switching means at said office and said substations being operative following said selection of said apparatus unit for switching their receiving relay chains for the transmission from the substation and reception at the office of a checking selecting code; said relay chain at said substation being thereupon responsive to the selection to selectively operate the transmitting contacts thereat to transmit a checking code over said line, said receiving relay at said office being responsive to said received checking code to selectively operate said relay chain thereat, said office switching means being operative in the event that said selection checking code corresponds to the selection code transmitted for conditioning the relay chain at the office to transmit an operation control code; said switching means at the substation being operative following the transmission of said selection checking code for conditioning the relay chain thereat to receive code signals from said office; said chain at said office being operative thereupon to selectively operate said transmitting contacts for transmitting a control code over said single signalling channel, said receiving relay at said substation being responsive to said received control code to selectively operate said relay chain thereat; means controlled by said relay chain in response to said control code for operating said selected unit, said switching means being operative thereupon to condition the relay chain at said substation to transmit a supervisory code and condition the relay chain at the office to receive said supervisory code, said relay chain at said substation thereupon controlling the transmitting contacts thereat to transmit a supervisory code in accordance with the operation of said selected unit; said receiving relay at said office being responsive to said supervisory code to operate the relay chain thereat; and means controlled by said relay chain in response to said supervisory code to provide an indication of the operation of said selected unit.

9. In a supervisory control system; a central office having a plurality of operating keys; a plurality of substations; a single signalling channel connecting the office and substations; a relay chain individual to the office and each of said substations; a transmitting relay at the office and each substation having contacts connected to said signalling channel; a receiving relay at the office and each substation connected to said channel; transmitting relay controlling means at each station for controlling the operation of the transmitting relay thereat, said means being normally non-operative; means responsive to an operation of a key at said office for rendering said transmitting relay controlling means thereat operative; said transmitting relay controlling means being thereupon responsive in accordance with the operation of the key to operate said transmitting relay for the transmission of code signals over said line; means whereby the receiving relay and relay chain at said office and said substations receive the said code; means controlled jointly by said operated key and said relay chain at the said office for terminating the transmission of said signals and for rendering said transmitting relay controlling means non-operative; means at a predetermined substation including the receiving relay and relay chain thereat responsive on receipt of a predetermined code for rendering the transmitting relay controlling means thereat operative to control the transmitting relay thereat for the transmission of a predetermined code over said signalling channel; and means whereby the relay chain at said predetermined substation and said office are operated in response to said last mentioned code; and means at said office including the receiving relay thereat responsive to said received code and controlled by said relay chain thereat in the event that the received code corresponds to the transmitted code for rendering said transmitting relay controlling means operative to cause the transmitting relay thereat to transmit a further code in accordance with the operated key.

10. In a signalling system, a plurality of stations, a source of direct current at each station, a single signalling channel connecting said stations, a transmitting relay at each station operable to transmit direct-current code signals from its associated direct current source over the signalling channel to any one of said stations, a receiving relay at each station connected across the signalling channel and responsive to said direct current code signals, a single relay chain at each station, means at each station including the transmitting relay, the relay chain and direct current source thereat whereby any one of said stations may seize the channel and transmit direct current code signals thereover to the other stations, each code signal comprising a different number of impulses, and means electrically interlocking said transmitting and receiving relays at each station to render the transmitting relay thereat ineffective to transmit code signals in the event the receiving relay thereat is operating in response to code signals being transmitted over the signalling channel from another station to prevent mutilation of signals in the event that more than one of said stations attempt to seize the line simultaneously.

11. In a signalling system, a plurality of stations, a single signalling channel extending between the stations, a source of direct current at each station, receiving and transmitting apparatus at each station including a single relay chain, a transmitting relay operable to apply current to the channel from its associated source and a receiving relay connected to be responsive to impulses transmitted over the channel, means at each station including the relay chain, the transmitting relay and direct current source thereat whereby code impulses of different predetermined numbers may be transmitted over the channel to said other stations, means at each station including the relay chain and receiving relay thereat whereby each of said other stations is selectively responsive to a predetermined code, and means at each station whereby if more than one station attempts to seize the line simultaneously, said stations are given control over the signalling channel in a predetermined sequence in accordance with the number of impulses in their assigned code.

12. In a supervisory control system, a control office, a plurality of substations, each substation having a plurality of apparatus units, a single relay chain at the office and at each substation having a normal non-operating position, a single signalling channel connecting said office and the substations, a transmitting relay and a receiving relay at the office and at each substation, means at said office operable to start the relay chain and transmitting relay in operation a predetermined number of times in succession to transmit a series of codes over the signalling channel to successively select a substation and an apparatus unit at the substation, said relay chain restoring to normal after each operation, means at the substation operable in response to the selecting codes received over the signalling channel for starting the relay chain and receiving relays thereat into operation to make selections in accordance with the codes received, said relay chain restoring to normal after each selecting operation, and means at the selected substation operative following each selection for starting the transmitting relay thereat and for restarting the relay chain in operation to transmit check codes over the signalling channel to the office following each selection operation, whereby the substation and apparatus unit selections are effected by the use of only a single relay chain at the office and each substation.

13. In a supervisory control system, a dispatcher's office, a plurality of substations, apparatus units at each of said substations, a source of direct current at the office and at each substation, a single signalling channel extending from the office to each of the substations, a single relay chain at each station, a transmitting relay at the office and each station operable to apply direct current to the signalling channel, a receiving relay at the office and each station responsive to impulses transmitted over the signalling channel, means at the office including the source of direct current, the relay chain and transmitting relay thereat and means at the stations including the relay chains, the receiving relays and sources of direct current thereat whereby the apparatus units may be selected and selectively controlled from the office over the single signalling channel, means at the substations including the relay chains, the transmitting relays and sources of direct current thereat and means at the office including the relay chain, the receiving relay and source of direct current thereat operative intermediate the selective and control operations to indicate the character of the selections and operations at the office whereby said signalling channel is used alternately by said office and said substations for transmitting selection, control and indication signals, means at each substation whereby any one may seize the signalling channel to transmit signals thereover, and means for preventing mutilation of signals in the event that more than one of said stations seize the channel simultaneously.

14. In a supervisory control system, a dispatcher's office, a plurality of substations, a plurality of apparatus units at said substations, a single relay counting chain at said office and at each of said substations, each of said relay counting chains having a normal non-operating position, a single signalling channel connecting said stations, means including said relay counting chain at the office for transmitting a selection code over the signalling channel to select a desired substation, means at the selected substation including the relay chain thereat responsive to said selection for transmitting an identification check code back to the office, said relay chains restoring to their normal non-operating positions following the completion of the selection and check codes, means at the office operable dependent on the identification check code checking with the substation selecting code for reoperating the relay chain at the office to transmit a selection code to select a desired apparatus unit, means at the selected substation responsive to the apparatus unit selection code for re-operating the relay chain thereat to transmit a supervisory code to the office, means at the office responsive to said supervisory code for indicating the condition of the selected unit, and means at the office for again re-operating the relay chain thereat to transmit an operation control code to operate the selected unit.

15. In a signalling system, a plurality of stations, a source of direct current at each station, a single signalling channel extending between the stations, said signalling channel being normally open circuited, a transmitting relay at each station operable to apply direct current to the channel from its associated source, a single relay chain at each station, a receiving relay at each station having its coil connected across the channel, means at each station and including the transmitting relay, the direct current source and the relay chain thereat whereby any one of said stations may seize the signalling channel to transmit code signals of different predetermined numbers of impulses thereover to operate the receiving relays at the other stations, and means at each station operable in response to the operation of the receiving relay thereat for rendering the said last mentioned means inoperative to transmit code signals while said receiving relay is in operation for preventing any other of said stations from seizing the channel during the period while said line is seized by the first station and code signals are being transmitted therefrom.

16. In a supervisory control system, a dispatcher's office, a plurality of substations, a single counting chain at the office and at each substation, said chains being normally in a receiving condition, apparatus units at the substations, a single signalling channel connecting the stations, a source of direct current at the office and at each station, a transmitting relay at the office and each station operable to connect their associated direct current sources to the channel, a receiving relay at the office and each substation having its winding connected to the channel, switching means at the office and the stations operable to switch their associated counting chains from receiving to transmitting condition, means including the direct current source, the relay chain, the switching means and the transmitting and receiving relays at the office for transmitting code signals over the channel to selectively operate the relay chains and receiving relays at the stations to make a station selection, means at the selected station including the direct current source, the relay chain, the switching means and the transmitting and receiving relays thereat responsive to said selection for transmitting a check code to the office to indicate the station selection, means at said office including the switching means thereat for again operating the relay chain and the transmitting and receiving relays thereat to transmit an apparatus unit selecting code to operate the relay chain and receiving relay at the selected station to select an apparatus unit, means at the selected station including the switching means, and the transmitting and receiving relays thereat for transmitting an apparatus indicating code to the office to operate the receiving relay and relay chain thereat, means at the office controlled by the relay chain and receiving relay thereat for indicating the selected unit, means at said office including the switching means, the relay chain and the transmitting and receiving relays thereat for transmitting operation control codes to selectively operate the relay chain and receiving relay at the selected station to selectively operate the selected unit, means at the selected station including the switching means, the relay chain and the transmitting and receiving relays thereat for transmitting a supervisory code to the office to operate the receiving relay and relay chain thereat, and means at the office controlled by said relay chain and receiving relay thereat for indicating the operation of the apparatus unit.

17. In a supervisory control system, a central station, a plurality of substations, a source of direct current at each of said stations, a single signalling channel extending from the central station to all of the substations, a single selector means at each station being normally in a receiving condition, means at each station operable to switch the selector means thereat to a transmitting condition, a transmitting relay at each station having transmitting contacts connected across the channel, a receiving relay at each station having an operating winding connected across the channel, selectively operable means at the first station including the direct current source, selector means, switching means, transmitting and receiving relays thereat for transmitting a predetermined number of selecting code signals over the signalling channel to select a desired substation and apparatus unit thereat, means at each substation including the receiving relay and selector means thereat responsive to said selecting code signals whereby a predetermined substation and apparatus unit thereat is selected, means at each substation including the direct current source, selector means, switching means and transmitting relay thereat whereby the selected substation selectively transmits code signals over the channel in accordance with the condition of the selected apparatus unit, and means at the first station including the receiving relay and selector means thereat for indicating the condition of the unit.

18. In a signalling system, a dispatcher's office, a plurality of substations, a source of direct current individual to each station, apparatus units at said substations, a single relay chain at the office and each substation normally in a receiving condition, means at the office and substations for switching said relay chains to a transmitting condition, signalling devices at the office individual to each apparatus unit, a single signalling channel extending from the office to the substations, a transmitting relay at the office and at each station for controlling the application of energy to said channel, a receiving relay at the office and each substation connected across the signalling channel, means at the office including the source of direct current, transmitting relay, receiving relay, switching means and relay chain thereat and means at the substations including the sources of direct current, receiving relays and relay chains thereat whereby any one of the substations and apparatus units therein may be selected from the office, means at the selected substation including the direct current source, relay chain, switching means, receiving relay and transmitting relay thereat and means at the office including the relay chain, receiving relay and source of direct current thereat for operating the signalling devices at the office to indicate the selection and the condition of the selected unit at the office, means at the office including the source of direct current, transmitting relay, receiving relay, switching means and relay chain thereat and means at the selected substation including the source of direct current, receiving relay and relay chain thereat for selectively operating the selected unit over the channel, and means at each substation including the sources of direct current, relay chains, switching means, receiving relays and transmitting relays thereat whereby any one of the substations may seize the signalling channel in response to the automatic operation of any unit to transmit signals thereover to the office to operate the signalling devices thereat.

19. In a signalling system, a plurality of stations, a central station, a source of direct current at each station, a single signalling channel extending between said central station and said plurality of stations, apparatus units at each of said plurality of stations, a single relay chain at each station normally in a receiving condition, means at each station for switching the relay chain thereat to a transmitting condition, signalling devices individual thereto at said central station, transmitting means at each station for applying the source of direct current thereat across said line, receiving means at each station connected across the signalling channel, means including an associated relay chain, source of direct current, switching means and receiving means responsive to an automatic operation of any one of said appartus units for seizing said signalling channel to operate said transmitting means to transmit signals of different numbers of impulses over the channel to said central station, means at said central station including the relay chain, source of direct current and receiving means thereat responsive to said signals for operating the associated signalling device, means including the relay chains and receiving means thereat for rendering said other plurality of stations non-operative to seize said signalling channel while the transmitting substation is in operation, and means at each substation operative in the event that an appartus unit thereat operates at any of said plurality of substations during the transmission of signals for storing said signals until said first mentioned signals have been transmitted, and means including the source of direct current, transmitting means, switching means and the relay chains at said stations whereby, following the transmission of said first mentioned signals, signals of different numbers of impulses are transmitted over said channel in accordance with the other apparatus operated.

20. In a signalling system, a plurality of substations, a central station, a source of direct current individual to each station, a single signalling channel extending between said central station and said plurality of stations, said signalling channel being normally open circuited, a single relay chain at each station normally in a receiving condition, means at each station for switching the relay chain thereat to a transmitting condition, a transmitting and a receiving relay at each station, apparatus units at each of said plurality of substations, signalling devices individual thereto at said central station, means including the associated source of direct current, relay chain, switching means and transmitting relay responsive to an automatic operation of any one of said apparatus units at a substation for seizing said signalling channel to transmit signals to said central station, means in said central station including the direct current source, receiving relay and relay chain thereat responsive to said signal for operating the associated signalling device, means including the relay chains, direct current sources and receiving relays thereat for rendering said other plurality of stations non-operative to seize said signalling channel while said first mentioned substation is in operation, means operative in the event that an apparatus unit operates at any of said plurality of substations during the transmission of signals for storing said signals until said first mentioned signals have been transmitted, and means including the associated direct current source, the relay chain, switching means and transmitting relay whereby, following the transmission of said first mentioned signals, signals are transmitted over said channel to the central station in accordance with the other apparatus units which have operated, whereby said means at the central station including the direct current source, relay chain and receiving relay thereat is again operated to actuate the signalling devices to indicate the condition of the units.

21. In a signalling system, a plurality of substations, a central station, a source of direct current individual to each station, a single signalling channel extending between said central station and said plurality of stations, said signalling channel being normally open circuited, a single relay chain at each station normally in a receiving condition, switching means at each station for switching the relay chain thereat to a transmitting condition, a transmitting and a receiving relay at each station, apparatus units at each of said plurality of stations, signalling devices individual thereto at said central station, means including an associated direct current source, relay chain, switching means and transmitting relay responsive to an automatic operation of any one of said apparatus units at a substation for seizing said signalling channel to transmit code signals to said central station, means at said central station including the direct current source, receiving relay and relay chain thereat responsive to said signals for operating the associated signalling device, means including the relay chains, direct current sources and receiving relays thereat for rendering said other plurality of stations nonoperative to seize said signalling channel while said first mentioned substation is transmitting code signals, means operative in the event that an apparatus unit operates at any of said plurality of substations during the transmission of signals by another substation for storing said signals until said first mentioned signals have been transmitted, means including the associated direct current source, relay chain, switching means and transmitting relay whereby, following the transmission of said first mentioned code signals, code signals are transmitted over said channel in accordance with the other apparatus operated, and means at each station for preventing multilation of signals in the event that more than one of said stations connected by said single channel attempt to transmit code signals simultaneously.

22. In a supervisory control system, a dispatcher's office, a plurality of substations, a counting chain at the office and at each of the substations disposed to function to control both sending and receiving operations and being normally in a receiving condition, apparatus units at the substations, signalling devices individual to the apparatus units at the office, a signal signalling channel extending from said office to each of said substations, means including said single signalling channel for operating said counting chain at the office and at the substations in synchronism, means including the counting chain at the office and at any one of the substations for selecting a desired substation for operation from said office over said single signalling channel, means for switching the operation of the counting chain at the office and at the substations from receiving to transmitting condition, means including said switching means and counting chains at the office and selected substation for selecting one of said apparatus units for operation, and indicating the selection at the office, means including said counting chains and the switching means at the office for selectively operating the selected apparatus unit, and means including said counting chains and the switching means at the selected substation for selectively operating the signalling devices at the office to indicate the operation of the apparatus unit at the office over said single signalling channel.

23. In a supervisory control system, a dispatcher's office, a plurality of substations, a counting chain at the office and at each substation disposed to function to control both receiving and sending operations and being normally in a receiving condition, apparatus units at the substations, signalling devices individual to the apparatus units at said office, a single signalling channel extending from said office to each of said substations, means including said single signalling channel for operating said counting chains at the office and substations in synchronism, means including said counting chains at the office and at one of said substations for selecting one of said substations for operation from said office over the single signalling channel, means at the office and at the substations for switching the operation of said chains from receiving to transmitting condition, means including said counting chains and switching means at the office and selected station for selecting one of said apparatus units for operation and indicating the selection at the office, means including said counting chains and said switching means for operating the selected apparatus unit and for selectively operating the signalling device individual thereto to indicate the operation at the office over said signalling channel, and means operative in the event that one of said apparatus units is automatically operated for indicating said operation over said signalling channel, said means including the counting chain at the office and the counting chain and switching means at the substation at which the automatic operation occurs.

24. In a supervisory control system, a dispatcher's office, a plurality of substations, a counting chain at the office and at each of the substations, apparatus units at the substations, signalling devices individual to the apparatus units at said office, a single signalling channel extending from said office to each of said substations, means including said single signalling channel for operating said counting chain at the office and substations in synchronism, means including said counting chains at the office and at a substation for selecting said substation for operation from said office over said single signalling channel, means responsive to the station selection and including said counting chains at the office and the selected station for selecting one of said apparatus units for operation, means responsive to said apparatus unit selection and including said counting chains at the office and selected station for indicating the selection at the office, means including said counting chains for selectively operating the selected unit and means including the said counting chains for selectively operating the signalling device to indicate the operation at the office over said single signalling channel, means including the relay chain at the office and an associated chain operative in the event that one of said apparatus units is automatically operated for indicating said operation over said signalling channel, said means including the counting chains at the office and substation in which the automatic operation occurred, and means operative in the event that said automatic operation of a unit occurs while said signalling channel is being used for storing said signal until the signalling channel is free to transmit signals.

25. In a supervisory control system, a central station, a plurality of substations, a source of direct current at said stations, apparatus units at said substations, a single relay chain at each station, a single normally open circuited signalling channel extending from said central station to each of said substations, a transmitting relay individual to each of said stations having transmitting contacts operable to connect the direct current source across the signalling channel, a receiving relay winding individual to each station connected across the signalling channel, and means including said single relay chains and said transmitting and receiving relays and said signalling channel and said sources of energy for selecting any one of the substations and an apparatus unit therein, selectively controlling a selected apparatus unit and indicating its condition at the central station from said central station, by means of separate code signals individual to each function.

26. In a supervisory control system, a central station, a plurality of substations, a source of direct current at said stations, apparatus units at said substations, a single relay chain at each station, a single normally open-circuited signalling channel extending from said central station to each of said substations; a plurality of control devices at the central station each individual to a unit, a transmitting relay individual to each of said stations; a circuit including said source of energy individual to each of said transmitting relays and applied across said signalling channel under control of its individual transmitting contacts; a receiving relay winding individual to each station connected across the signalling channel, and means including said control devices, said relay chains, said transmitting and receiving relays, said signalling channel and said sources of energy for selecting, selectively controlling and indicating the condition of said apparatus units at each of said substations from said central station, by means of a code combination of impulse conditions individual to each function to be performed.

27. In a supervisory control system, a central station, a plurality of substations, a source of direct current at said stations, apparatus units at said substations, a single signalling channel extending from said central station to each of said substations, a transmitting relay at each of said stations, a circuit including said source of direct current individual to each of said transmitting relays and applied across said signalling channel under control of its individual transmitting contacts, a receiving relay at each station having its winding connected across the signalling channel, a relay chain at each station, said transmitting relay at each station being operable to connect the direct current source thereat across the signalling channel for transmitting code combinations of impulse conditions over such single signalling channel in accordance with a predetermined desired operation, means at the central station including the relay chain thereat for selectively operating the transmitting relay to transmit different code signals, said receiving relays at each station being responsive to said impulses for selectively operating their associated relay chains in accordance with received code signals, means including all of said receiving relays in response to a predetermined code for locking out all but a predetermined substation in response to said code, means at the selected substation for conditioning the relay chain thereat to operate its associated transmitting relay to transmit an identification code back to said central station over said signalling channel through the operation of its associated relay chain.

HANS P. BOSWAU.